US011468354B1

(12) United States Patent
Helwani et al.

(10) Patent No.: US 11,468,354 B1
(45) Date of Patent: Oct. 11, 2022

(54) ADAPTIVE TARGET PRESENCE PROBABILITY ESTIMATION

(71) Applicant: Amazon Technologies, Inc., Seattle, WA (US)

(72) Inventors: Karim Helwani, Mountain View, CA (US); Alexander Caughron, San Jose, CA (US); Amin Hani Atrash, Los Altos, CA (US); Aarthi Raveendran, San Jose, CA (US); Kevin V. Macwan, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 467 days.

(21) Appl. No.: 16/708,747

(22) Filed: Dec. 10, 2019

(51) Int. Cl.
| G06N 7/00 | (2006.01) |
| G06F 16/28 | (2019.01) |
| G10L 15/22 | (2006.01) |
| G10L 25/78 | (2013.01) |
| G06N 20/00 | (2019.01) |

(52) U.S. Cl.
CPC .......... G06N 7/005 (2013.01); G06F 16/285 (2019.01); G06N 20/00 (2019.01); G10L 15/22 (2013.01); G10L 25/78 (2013.01)

(58) Field of Classification Search
CPC .................................................. H01Q 3/2605
USPC ............................................................. 706/24
See application file for complete search history.

(56) References Cited

U.S. PATENT DOCUMENTS 9,635,116 B2 * 4/2017 Anand .................... H04L 67/52

* cited by examiner

Primary Examiner — George C Monikang
(74) Attorney, Agent, or Firm — Pierce Atwood, LLP

(57) ABSTRACT

A system may perform adaptive target presence probability to predict a location of a user (e.g., target) at a given time based on accumulated observations. For example, the system may track a location of the user over time and generate observation data associated with a user profile. The observation data may include a plurality of observations, with a single observation corresponding to a location and time at which the user was detected. The system may apply a clustering algorithm to the observation data to generate probability distributions (e.g., clusters) associated with discrete locations. For example, the system may group observations that are in proximity to each other and separate the groups based on location. Using the probability distribution for an individual cluster, the system may determine a likelihood that the user is present at a location corresponding to the cluster.

20 Claims, 23 Drawing Sheets

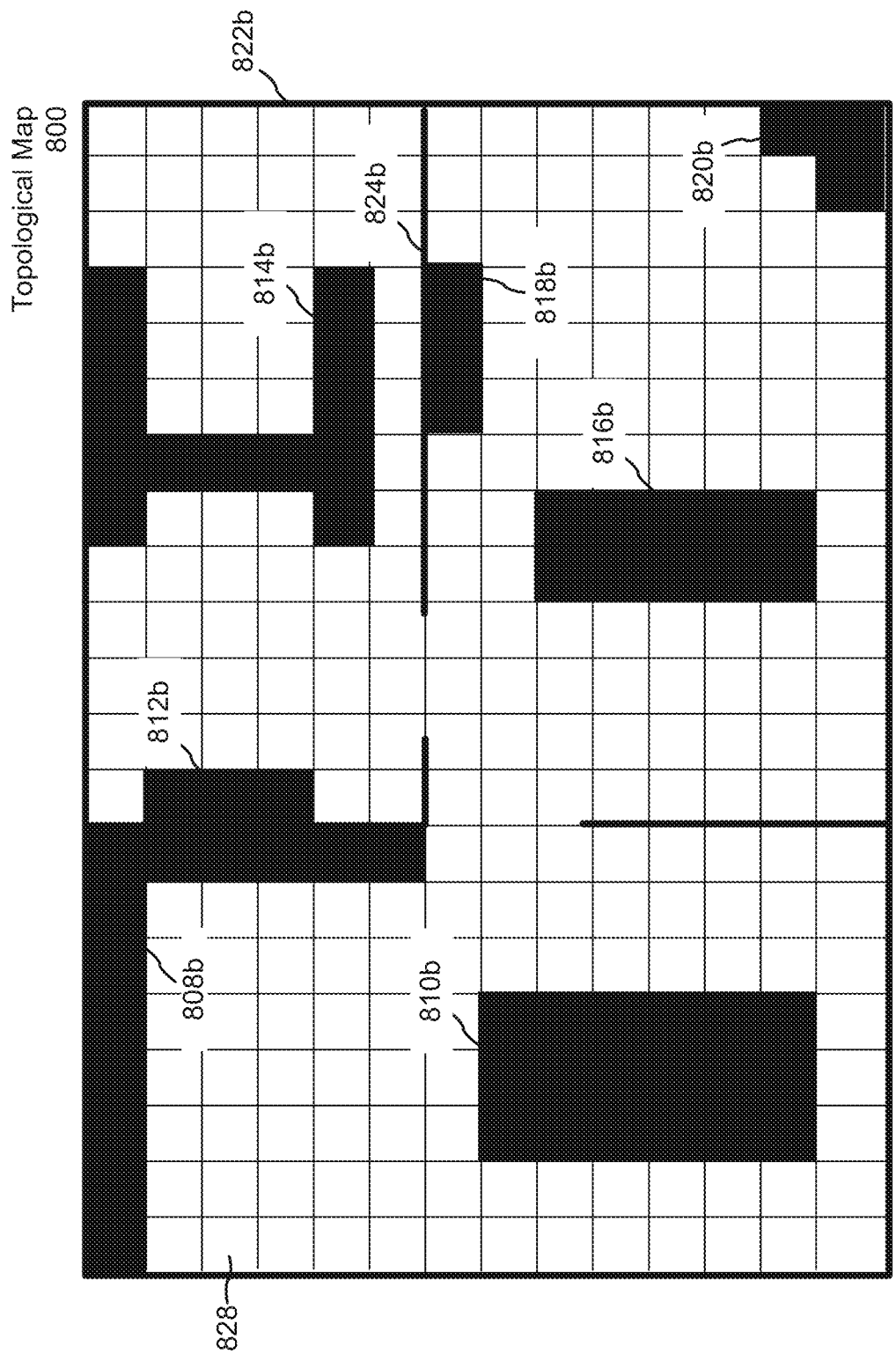

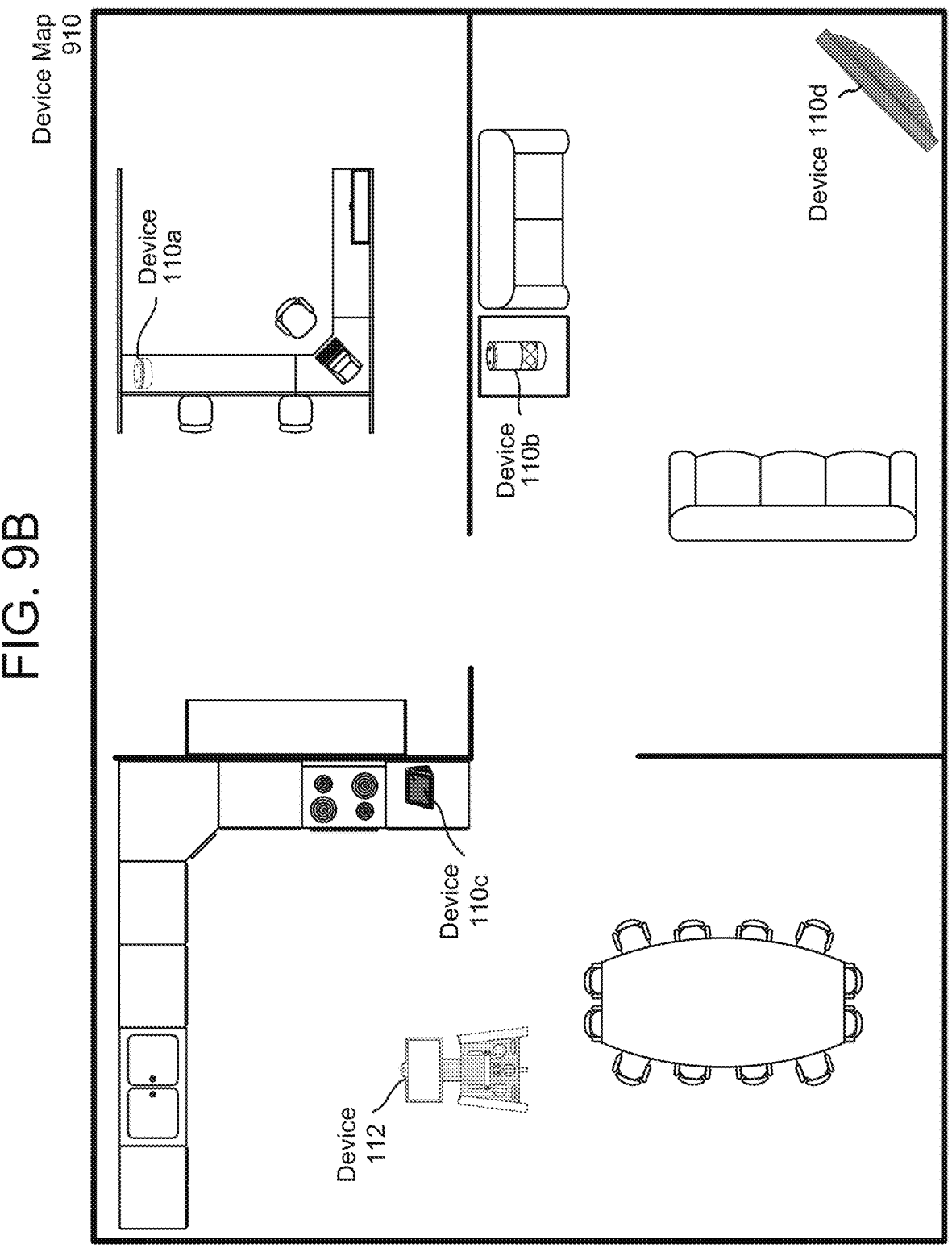

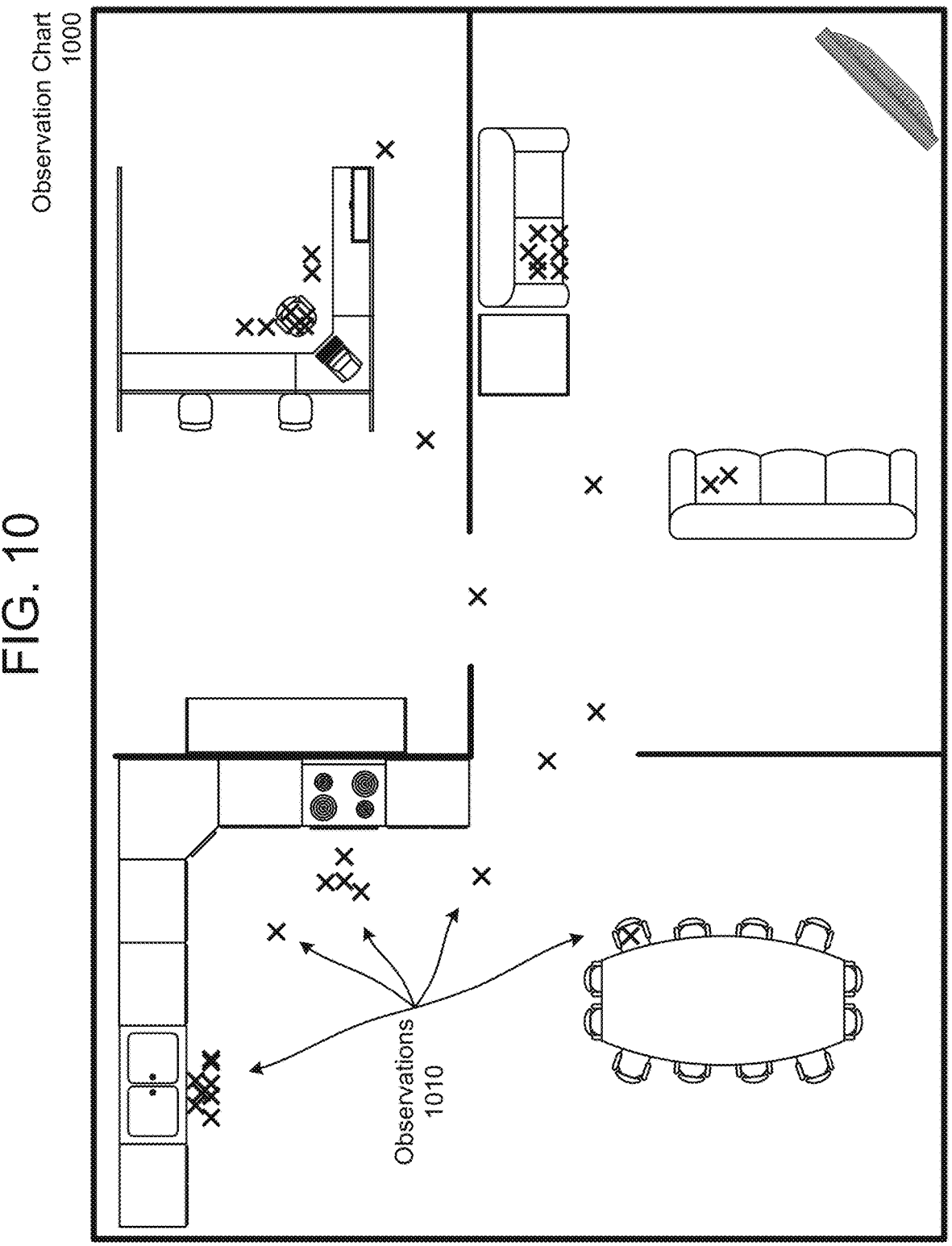

FIG. 14

| Coordinates |
| --- |
| [Location A] |

Location Data
1410

| Coordinates | Probability |
| --- | --- |
| [Location A] | [Probability A] |
| [Location B] | [Probability B] |
| [Location C] | [Probability C] |
| [Location D] | [Probability D] |
| [Location E] | [Probability E] |

Location Data
1420

| Coordinates of Center | Covariance Matrix | Probability |
| --- | --- | --- |
| [x1, y1] | [Matrix A] | [Probability A] |
| [x2, y2] | [Matrix B] | [Probability B] |
| [x3, y3] | [Matrix C] | [Probability C] |
| [x4, y4] | [Matrix D] | [Probability D] |
| [x5, y5] | [Matrix E] | [Probability E] |

Location Data
1430

FIG. 15

Presence Probability 1510

$$P(t_i) = \sum_k P(t_i, y_k)$$

$$P(t_i) = P(t_i, y_i) + \sum_{\iota} P(t_i, y_k)$$

$$P(t_i) = P(t_i, y_i) + P(t_i)[1 - P(y_i)]$$

$$P(t_i) = \frac{P(t_i, y_i)}{P(y_i)}$$

Presence Probability 1520

$$P(t_i) = \sum_m \sum_{n \neq m} \sum_k [\, P(t_i, y_k^m) - P(t_i, y_k^m, y_k^n) \,])$$

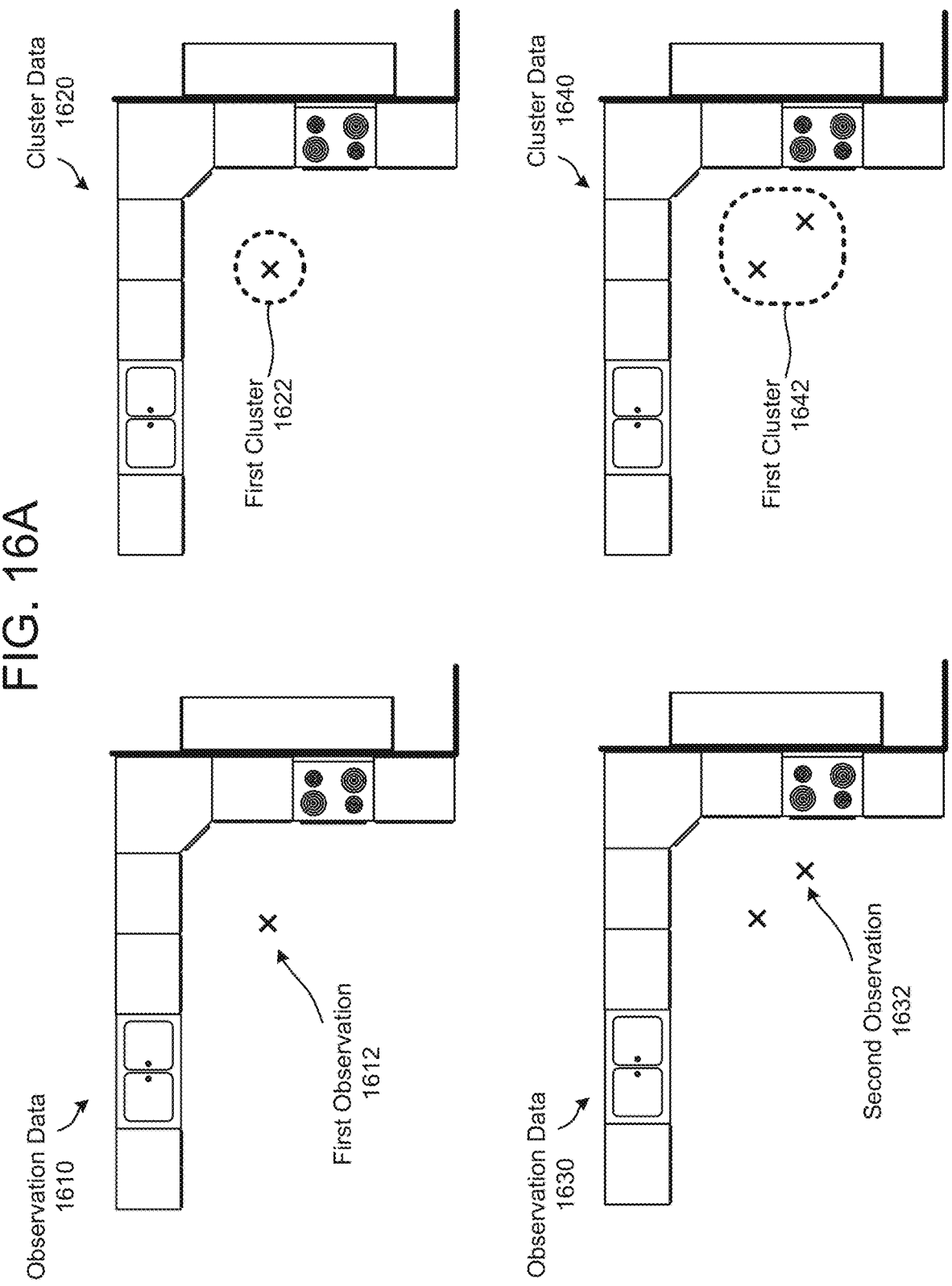

ADAPTIVE TARGET PRESENCE PROBABILITY ESTIMATION

BACKGROUND

With the advancement of technology, the use and popularity of electronic devices has increased considerably. Electronic devices are commonly used to capture and send audio data and/or image data.

BRIEF DESCRIPTION OF DRAWINGS

For a more complete understanding of the present disclosure, reference is now made to the following description taken in conjunction with the accompanying drawings.

FIGS. 8A-8B illustrate an environment and a topological map of the environment according to embodiments of the present disclosure.

FIGS. 9A-9B illustrate examples of an environment and devices within the environment according to embodiments of the present disclosure.

FIG. 10 illustrates examples of observations generated by one or more devices according to embodiments of the present disclosure.

FIG. 14 illustrates examples of location data according to embodiments of the present disclosure.

FIG. 15 illustrates examples of generating probability data according to embodiments of the present disclosure.

FIGS. 16A-16B illustrate examples of updating cluster data according to embodiments of the present disclosure.

DETAILED DESCRIPTION

Electronic devices are commonly used to interact with a user by capturing audio data, image data, and/or other input data and performing an action. For example, a device may receive a voice command instructing the device to play music and the device may generate output audio corresponding to the voice command. To improve an interaction with the user, the device may perform human presence detection and/or identify a location of the user, enabling the device to customize the action based on the location of the user. Described herein is, among other things, new technology directed to performing adaptive target presence probability estimation to estimate the location of the user.

To improve presence probability estimation, devices, systems and methods are disclosed that predicts a location of the user (e.g., target) at a given time based on accumulated observations. For example, the system may track a location of the user over time and generate observation data associated with a user profile. The observation data may include a plurality of observations, with a single observation corresponding to a location and time at which the user was detected. The system may perform adaptive target presence probability estimation by applying a clustering algorithm to the observation data to generate probability distributions (e.g., clusters) associated with discrete locations. For example, the system may group observations that are in proximity to each other and separate the groups based on location. Using the probability distribution for an individual cluster, the system may determine a likelihood that the user is present at a location corresponding to the cluster.

Figure 1:
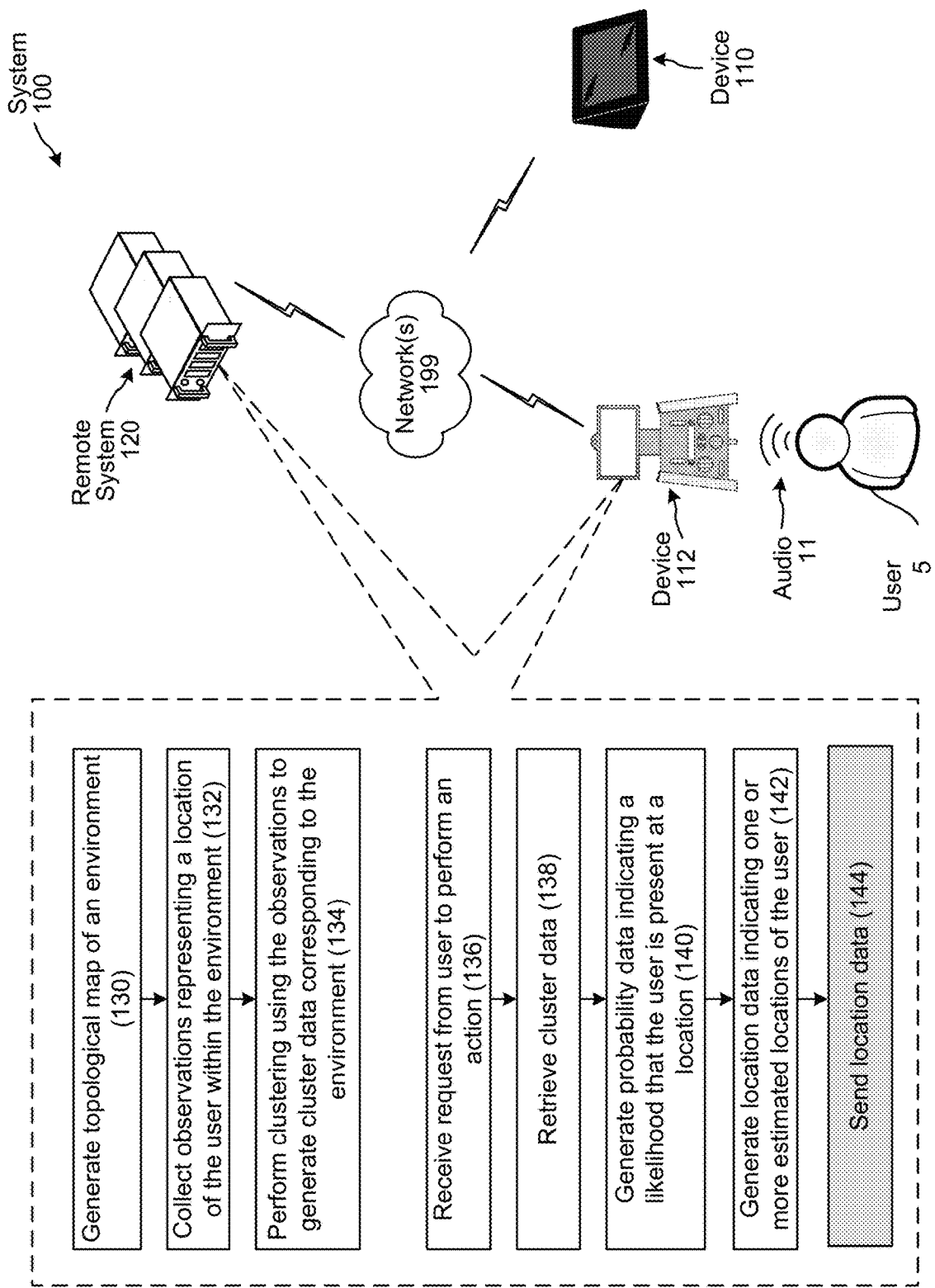
FIG. 1 is a conceptual diagram of a system configured to perform adaptive target presence probability estimation according to embodiments of the present disclosure.

FIG. 1 illustrates a system configured to perform adaptive target presence probability estimation according to embodiments of the present disclosure. For example, a system 100 may perform adaptive target presence probability estimation to estimate a location of a user 5 based on non-uniform sparse observations in an environment 102 with a known topology and recurring presence patterns.

Although the figures and discussion of the present disclosure illustrate certain operational steps of the system in a particular order, the steps described may be performed in a different order (as well as certain steps removed or added) without departing from the intent of the disclosure. While the below description describes the steps of FIG. 1 being performed by the device 112 and/or the remote system 120, one skilled in the art will appreciate that the device(s) 110 may perform some or all of the steps described with respect to FIG. 1 without departing from the present disclosure.

As illustrated in FIG. 1, a device 112 (e.g., motile device) may be associated with a user 5 and may communicate with a device 110 and/or a remote system 120, using one or more networks 199. The user 5 may interact with the device 112 and/or the device 110, such as requesting that the device 110/112 and/or the remote system 120 perform an action. While FIG. 1 illustrates the user 5 interacting with the device 112, the disclosure is not limited thereto and the user 5 may interact with the device 110 without departing from the disclosure.

As illustrated in FIG. 1, in some examples the device 110/112 may be a speech-enabled device and may detect audio 11 spoken by the user 5. The device 110/112 may determine that the audio 11 includes a wakeword and may then send audio data corresponding to the audio 11 to the remote system 120. The remote system 120 may receive the audio data from the device 110/112 and process the audio data, for example using speech processing such as automatic speech recognition (ASR) processing, natural language understanding (NLU) processing, and/or the like, to determine that the audio data represents a request to perform an action. The remote system 120 may perform the action and/or send a command to the device 110/112 or another device (not illustrated) to perform the action. Additionally or alternatively, the user 5 may provide input data other than audio data without departing from the disclosure. Although FIG. 1 illustrates a single example of a device 110, many other devices may be used without departing from the disclosure, such as a smartphone, television, computer, appliance, or other device depending on system configuration.

To improve an interaction with the user 5, the device 110/112 and/or the remote system 120 may estimate a location of the user 5. In some examples, as part of performing the action, the system 100 may estimate the location of the user 5 and modify the action based on the estimated location. For example, in response to a voice command to turn on the lights, the system 100 may determine the estimated location of the user 5, determine one or more light switches associated with the estimated location, and send a command to the one or more light switches to turn on, although the disclosure is not limited thereto. Thus, the system 100 may use the estimated location to perform the action requested by the user 5, which may improve a user experience. Additionally or alternatively, the system 100 may anticipate a future request from the user 5 based on the estimated location of the user 5 at a given time.

To illustrate another example, as the device 112 is motile (e.g., capable of motion), the device 112 may use the estimated location of the user 5 in order to perform the action. For example, the device 112 may be at a first location and may move to the estimated location of the user 5 to perform the action for the user 5. Additionally or alternatively, while FIG. 1 and the following drawings illustrate examples of the system 100 responding to a request by the user, the disclosure is not limited thereto and in other examples the system 100 may use the estimated location of the user to perform an action without being requested by the user 5. For example, the system 100 may follow the user 5 and/or provide other functionality based on the estimated location of the user 5 without being prompted by a voice command.

In order to accurately estimate the location of the user 5, the system 100 may generate (130) a topological map of an environment 102, as will be described in greater detail below with regard to FIGS. 8A-9B. For example, the environment may correspond to one or more rooms within a building (e.g., residence, business, etc.) and the topological map may identify a rough outline of the building, one or more rooms within the building, furniture or other objects within the one or more rooms, and/or the like without departing from the disclosure. In some examples, the topological map may include detailed measurements and/or dimensions of the one or more rooms and/or the building, although the disclosure is not limited thereto.

Figure 8A:
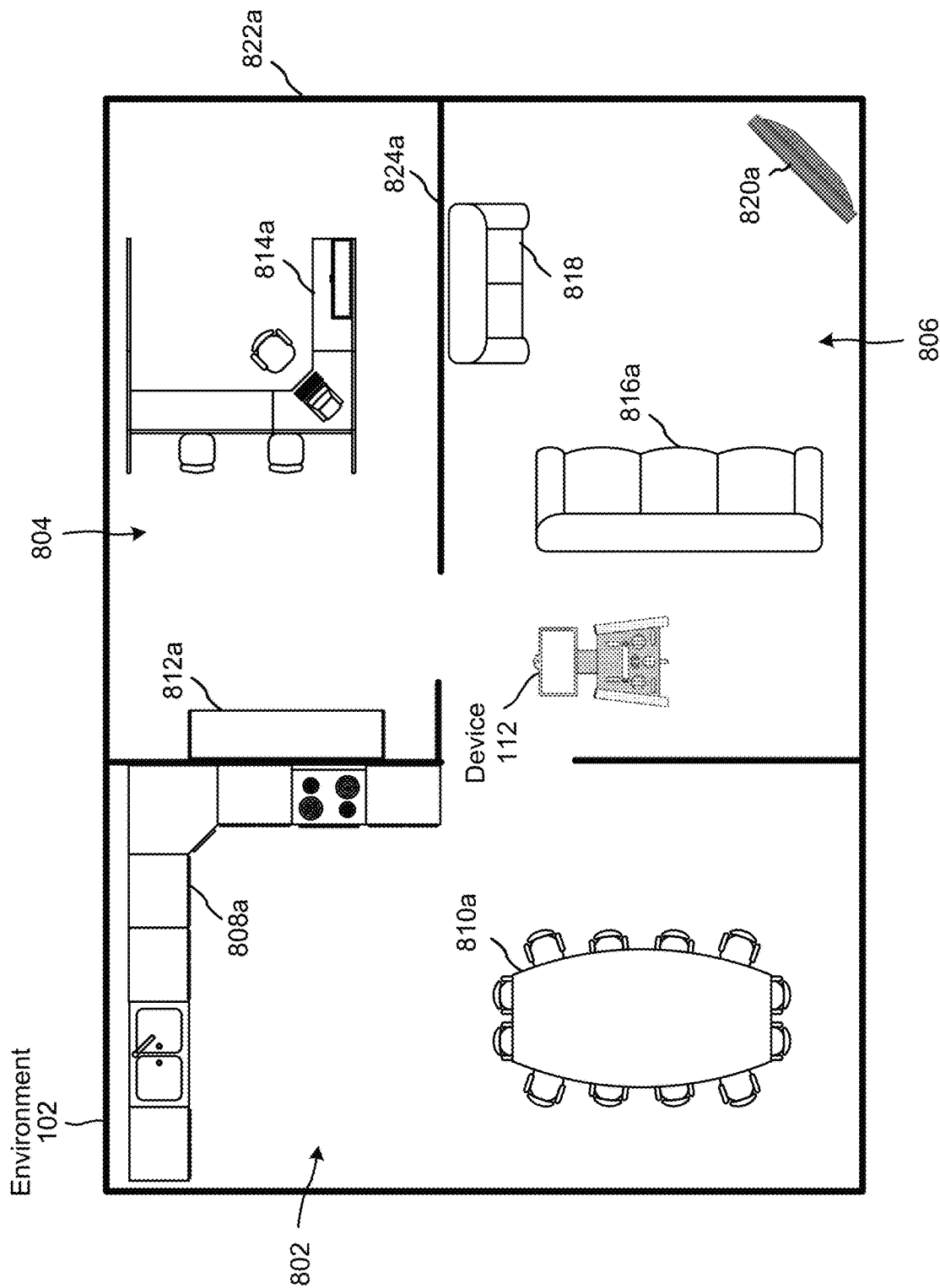

The system 100 may generate the topological map using multiple techniques without departing from the disclosure. For example, FIGS. 8A-8B illustrate examples of the device 112 generating the topological map using sensor data, measurement data, and/or the like. However, the disclosure is not limited thereto and in some examples the system 100 may generate the topological map using one or more devices 110 without departing from the disclosure. For example, the system 100 may use acoustic beamforming and/or other acoustic properties to identify acoustically reflective surfaces (e.g., walls, furniture, objects, etc.) around each device 110, an approximate location of the acoustically reflective surfaces relative to the device 110, an approximate distance and/or direction between a pair of devices 110, and/or the like. Thus, a plurality of devices 110 located within the environment may piece together the topological map without departing from the disclosure.

The system 100 may collect (132) observations (e.g., observation data) representing a location of the user within the environment over time. For example, the system 100 may use human presence detection and/or other techniques known to one of skill in the art to track a location of the user 5, storing observation data that associates the location of the user 5 over time with a user profile corresponding to the user 5. Thus, the system 100 may store observation data for each individual user profile and the observation data may indicate an exact position within the environment of the user 5 at various times.

To illustrate an example of observation data, the system 100 may generate a first observation (e.g., first data) indicating that a first user associated with a first user profile is detected at a first location during a first time period. The first location may be indicated using first coordinate data (e.g., first coordinates), although the disclosure is not limited thereto and the coordinate data may vary without departing from the disclosure. Similarly, the first time period may be indicated using a timestamp, a range of time values, and/or the like, although the disclosure is not limited thereto. The system 100 may then generate a second observation (e.g., second data) indicating that the first user is detected at a second location (e.g., represented by second coordinate data) during a second time period. The observation data (e.g., combined data) associated with the first user profile may include a plurality of observations (e.g., plurality of locations at which the user is detected), including the first observation and the second observation, enabling the system 100 to track a location of the first user over time. Thus, each observation represented by the observation data may indicate a specific user and/or user profile, a specific account (e.g., user profile associated with multiple users), a specific location, a specific time period, and/or the like at which a user is detected (e.g., remotely sensed) by the system 100.

The system 100 may use one or more devices 110/112 to identify the location of the user relative to the device 110/112. In some examples, the device 110/112 may be stationary and the system 100 may associate a fixed location with the device 110/112. For example, the system 100 may determine the fixed location using sensor data (e.g., location sensor data, such as Global Positioning System (GPS) data), wireless signals (e.g., (Ultra)-Sound signals, Bluetooth, etc.), wireless network data (e.g., wireless communication networks in range, such as WiFi, Long Term Evolution (LTE) network, WiMAX network, 3G network, 4G network, 5G network, etc.), audio processing (e.g., beamforming relative to other devices), image processing (e.g., object recognition and/or the like), and/or a combination thereof without departing from the disclosure. However, the disclosure is not limited thereto and instead of being associated with a fixed location, in some examples the device 110/112 may determine a current location without departing from the disclosure. Additionally or alternatively, the device 112 may be a motile device capable of moving within the environment independently of the user without departing from the disclosure.

The system 100 may identify the location of the user relative to the one or more devices 110/112 by remotely sensing (e.g., directly observing) the user using various techniques known to one of skill in the art, including sound localization (e.g., audio beamforming), audio processing (e.g., speech recognition), image processing (e.g., facial recognition, object recognition, and/or the like), sensor data (e.g., sensors configured to detect human presence, measure distance(s), and/or the like), and/or the like without departing from the disclosure. While in some examples the system 100 may track a location of the user using tracking data associated with a mobile device (e.g., smartphone and/or wearable device associated with the user), the tracking data is not an example of remotely sensing the user and is not included in the observation data. Thus, while the system 100 may supplement the observation data with the tracking data, the observation data corresponds to the devices 110/112 individually detecting a location associated with a specific user.

The system 100 may perform (134) clustering using the observations to generate cluster data corresponding to the environment. For example, the system 100 may process the observation data using a clustering algorithm to try to fit the observation data into multiple normal distributions. To illustrate an example, the system 100 may use a first clustering algorithm, such as a Gaussian Mixture Model (GMM) fit to an Expectation-Maximization (EM) algorithm, to generate multi-modal probability distributions represented by cluster data. The cluster data may represent each individual probability distribution using a centroid (e.g., mean of coordinate data associated with the probability distribution) and variance (e.g., covariance data). For example, a first probability distribution may be referred to as a first cluster and may be represented by a position of the mean (e.g., x and y coordinates within the topological map that correspond to the mean of coordinate data associated with the first cluster) and a covariance matrix (e.g., 2×2 matrix describing the covariance of the first cluster).

The system 100 may receive (136) a request (e.g., voice command or the like) from the user 5 to perform an action. As described in greater detail above, as part of performing the action the system 100 may determine that an estimated location of the user 5 will improve a user experience associated with the action. While the system 100 may be configured to determine a current location of the user 5 in certain conditions, the estimated location of the user 5 may improve the user experience when the current location of the user 5 cannot be determined, is constantly changing (e.g., user 5 is moving), and/or the request is not associated with the current location of the user 5. For example, the user 5 may issue a voice command to the device 112 and the device 112 cannot perform audio localization or have direct line of sight to identify the location of the user 5, the device 112 may be following the user 5 at a slower rate of speed and lose sight of the user 5, the request may correspond to an alarm instructing the device 112 to locate the user 5 at a specific time, and/or the like.

The system 100 may retrieve (138) the cluster data calculated in step 134 and may generate (140) probability data indicating a likelihood that the user 5 is present at a location. For example, the system 100 may determine a probability value for a first location by comparing a number of observations associated with the first location to a total number of observations.

As described above, the observation data may include a total number of observations (e.g., number of samples), with a single observation indicating a specific location at which a specific user is detected during a specific time period, while the cluster data may indicate a location and/or area associated with a cluster. Thus, the cluster data does not indicate a first number of observations associated with a first cluster, but the system 100 may determine the first number of observations using the observation data. For example, the system 100 may use the location data (e.g., first area) associated with the first cluster to identify the first number of observations in which the user is detected within the first area. Thus, the system 100 may associated individual observations with a corresponding cluster and/or time period and generate the probability data accordingly.

In some examples, the total number of observations corresponds to a total number of times that the system 100 detects that the user is present in the environment. Thus, the probability data indicates a likelihood that, if the user is present in the environment, the user is at a particular location. For example, the system 100 may identify six different clusters in the observation data and may determine six different probability values corresponding to the six different clusters, such that a first probability value indicates a likelihood that the user is in a first location associated with a first cluster, a second probability value indicates a likelihood that the user is in a second location associated with a second cluster, and so on. If the six clusters correspond to the total number of observations, the six probability values add up to a value of 1 (e.g., 100%).

The disclosure is not limited thereto, however, and in other examples the total number of observations corresponds to a total number of potential observations in which the user may be detected in the environment during a period of time, regardless of whether the user is actually detected. Thus, the probability data indicates a likelihood that the user is present in the environment at a particular location, taking into account the possibility that the user is not present in the environment. For example, the system 100 may determine a total number of potential observations based on a rate at which individual devices 110/112 detect presence of the user within the period of time.

To illustrate a first example corresponding to observation data generated by a single device 110/112, if a first device 110/112 detects a position of the user every minute (e.g., generates an observation 60 times an hour) and the period of time corresponds to a day (e.g., 24 hours), the system 100 may determine that the total number of potential observations is equal to 1440 observations (e.g., 60×24=1440 observations). To illustrate a second example corresponding to observation data generated by two devices 110/112, the system 100 may determine that the total number of potential observations is equal to 2880 observations (e.g., 2×60×24=1440 observations). However, the disclosure is not limited thereto and a rate at which the devices 110/112 detect the position of the user, a number of devices 110/112, and/or a length of the period of time may vary without departing from the disclosure. For example, the system 100 may determine the total number of potential observations based on k devices, with each device having varying rates of observation (e.g., human presence detection), for any period of time without departing from the disclosure. Further details regarding determining the probability data are described below with regard to FIGS. 13-15.

The system 100 may generate (142) location data indicating one or more estimated locations of the user. Thus, the location data may indicate one or more locations having a highest likelihood (e.g., highest probability value) of the user being present at a given time. For example, the system 100 may output a single location having a highest probability value, may output n locations having the n highest probability values, and/or the like without departing from the disclosure.

In some examples, the system 100 may identify that a first cluster is associated with the most observations and may generate the location data indicating a first location associated with the first cluster. The system 100 may represent the first location using coordinates of a center of the first cluster (e.g., mean value of a plurality of coordinates associated with the observations that correspond to the first cluster), a range of coordinates encompassing an area of the first cluster (e.g., a list of blocks associated with the first cluster, a range of coordinate values indicating a perimeter of the first cluster, etc.), the coordinates of the center and a variance (e.g., covariance matrix) of the first cluster, and/or other techniques known to one of skill in the art.

The system 100 may optionally send (144) the location data to a separate device, such as the device 112, the device 110, and/or the remote system 120. For example, if the remote system 120 performs steps 136-142, the remote system 120 may send the location data to the device 110/112. Similarly, if the device 112 performs steps 136-142, the device 112 may send the location data to the device 110 and/or the remote system 120. However, in some examples the device 112 may generate the location data and use the location data internally to perform an action or the like, without sending the location data to an external device, without departing from the disclosure.

The location data indicates that the user is likely to be present within a specific area. In some examples, the location data may include a probability value indicating a likelihood that the user is present within the area, although the disclosure is not limited thereto. For example, if the location data indicates n best locations (e.g., n locations having the n highest probability values), the location data may include both the n locations and the n probability values.

In some examples, the device 112 may perform additional processing using the location data to select form the n best locations. Thus, the device 112 may use the location data to travel to different locations and determine whether the user is present. For example, the device 112 may select the highest probability value and choose a corresponding location (e.g., prioritize highest likelihood), may select a nearest location of the n best locations (e.g., prioritize least amount of travel time), may select multiple locations in proximity (e.g., if highest probability value is in a first direction, but multiple locations are in a second direction, travel in the second direction to check each of the multiple locations), may select a safest location of the n best locations (e.g., prioritize safety), and/or the like.

For ease of illustration, the disclosure may describe that observations indicate that a user is detected at a first location and that a cluster corresponds to a second location. Thus, both observations and clusters correspond to a location. However, the first location associated with an observation indicates a specific location or exact coordinates at which the user is detected, whereas the second location associated with the cluster indicates an area (e.g., a range of coordinates) within which the user may be present. Thus, the first location is specific to a single point, which can be represented by coordinates associated with the point, while the second location refers to an area centered around a single point, which can be represented using coordinates of a center of the area as well as a size of the area (e.g., covariance matrix indicating the distribution of the cluster).

Figure 2:
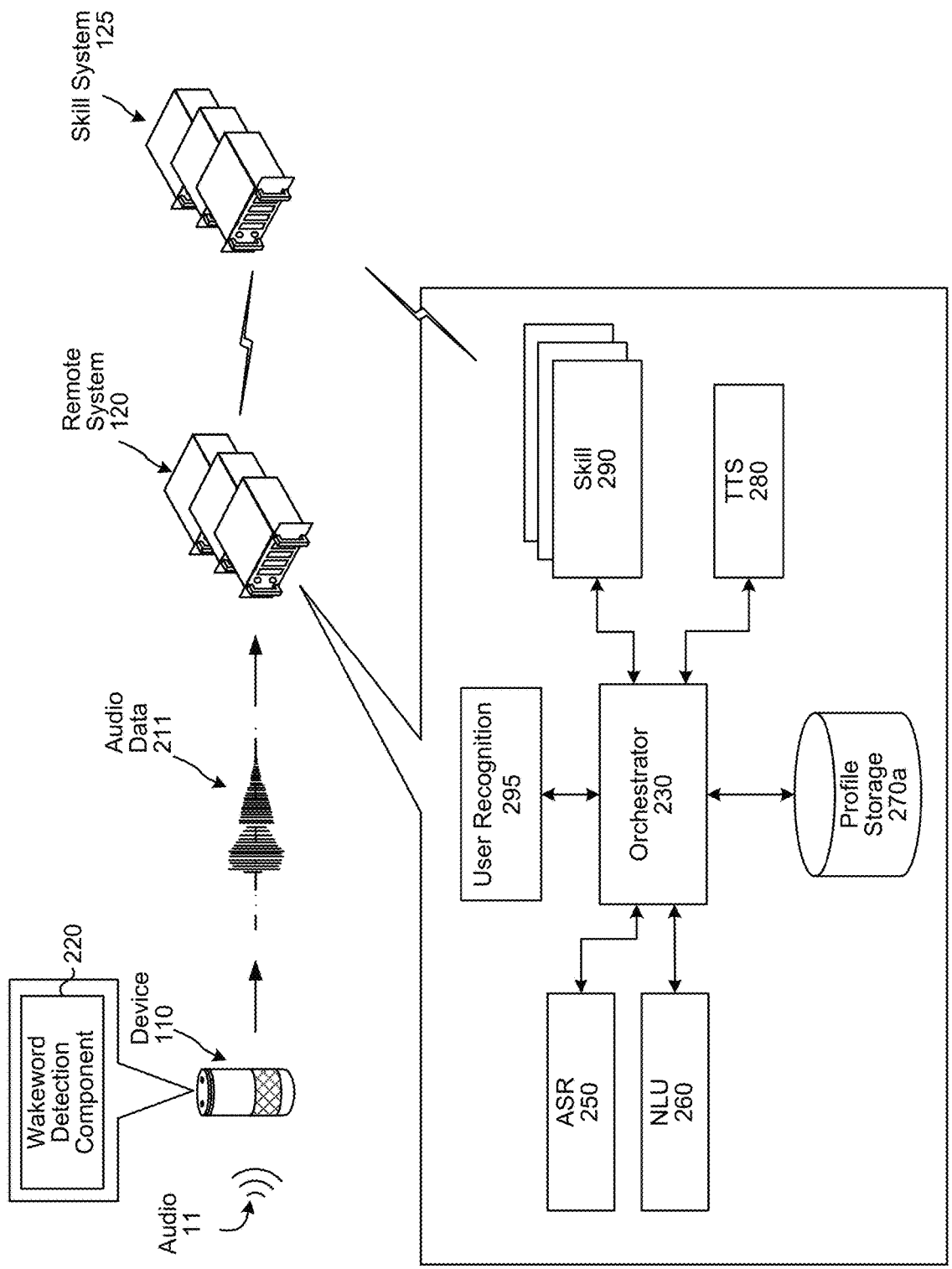
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone or array of microphones of the device 110/112, captures audio 11. The device 110/112 processes audio data, representing the audio 11, to determine whether speech is detected. The device 110/112 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110/112 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110/112 may use a wakeword detection component 220 to perform wakeword detection to determine when a user intends to speak an input to the device 110/112. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the remote system 120 and/or may be provided by the user 5.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110/112 may wake and begin transmitting audio data 211, representing the audio 11, to the remote system 120. The audio data 211 may include data corresponding to the wakeword, or the portion of the audio data 211 corresponding to the wakeword may be removed by the device 110/112 prior to sending the audio data 211 to the remote system 120.

Upon receipt by the remote system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 110/112, the remote system 120, the skill system 125, etc.) to execute the intent. For example, if the text data corresponds to "call John," the NLU component 260 may determine an intent that the system establish a two-way communication channel between the device 110/112 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the remote system 120 that is akin to a software application running on a traditional computing device. That is, a skill component 290 may enable the remote system 120 to execute specific functionality in order to perform one or more actions (e.g., provide information to a user, display content to a user, output music, or perform some other requested action). The remote system 120 may be configured with more than one skill component 290. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 290 may operate in conjunction between the remote system 120 and other devices such as the device 110/112 or a skill system 125 in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the remote system 120 (as illustrated in FIG. 2) or may be located at whole (or in part) with one or more separate systems. Unless expressly stated otherwise, reference to a skill, skill device, or skill component may include a skill component operating within the remote system 120 (for example as skill component 290) and/or skill component operating within a system separate from the remote system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill.

The remote system 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The remote system 120 may include profile storage 270a and/or the skill system 125 may include profile storage 270b. The profile storage 270a/270b may include a variety of information related to individual users, groups of users, etc. that interact with the system. The profile storage 270a/270b may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270a/270b may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located. Permissions may be obtained from a user associated with the device 110/112, or other devices discussed herein.

The remote system 120 may include a user recognition component 295 that recognizes one or more users associated with data input to the system. The user recognition component 295 may take as input the audio data 211 and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

Figure 3:
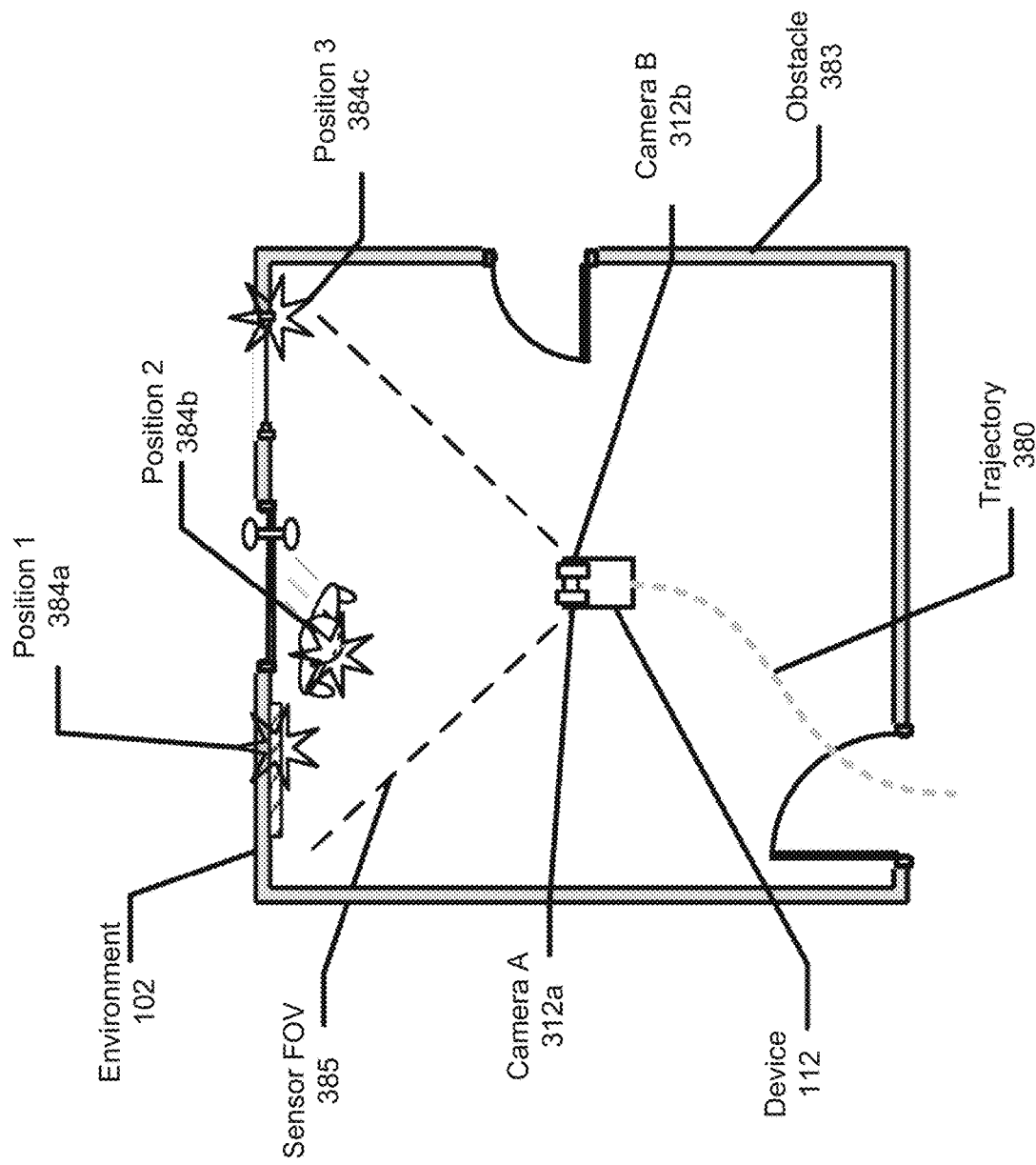
FIG. 3 illustrates a view of a motile device in an environment according to embodiments of the present disclosure.

FIG. 3 illustrates a view of a motile device in an environment according to embodiments of the present disclosure. As shown in FIG. 3, the motile device 112 may move in the environment 102. The motion of the motile device 112 may be described as a trajectory 380, as shown in FIG. 3. In some implementations, the trajectory 380 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

As described above, one or more motors or other actuators enable the motile device 112 to move from one location in the environment 102 to another. For example, a motor may be used to drive a wheel attached to a chassis of the motile device 112, which causes the motile device 112 to move. The motile device 112 may turn, move forward, move backward, and so forth. In another example, actuators may move legs allowing the motile device 112 to walk.

Figure 4:
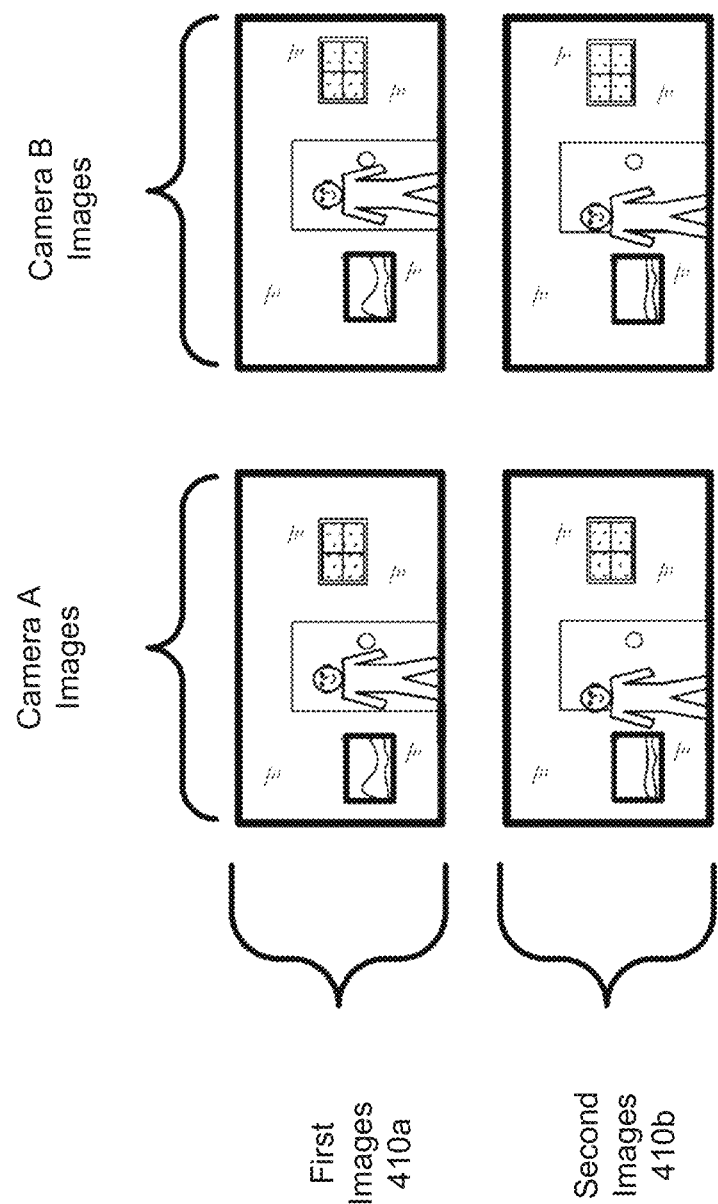
FIGS. 4 and 5 illustrate images captured by a motile device in an environment according to embodiments of the present disclosure.

The motile device 112 may include one or more sensors 114. For example, the sensors 114 may include a first camera 312a, a second camera 312b, an inertial measurement unit (IMU), microphones, time-of-flight (TOF) sensors, and so forth. The first camera 312a and the second camera 312b may be mounted to a common rigid structure that maintains a relative distance between the cameras 312a, 312b. An IMU may be attached to this common rigid structure, or one of the cameras affixed thereto. The first camera 312a and the second camera 312b may be arranged such that a sensor field-of-view 385 of the first camera 312a overlaps at least in part a sensor field-of-view of the second camera 312b. The sensors 114 may generate sensor data (which may be stored in storage). The sensor data may include image data acquired by the first camera 312a and/or the second camera 312b. For example, as shown in FIG. 4, a pair of images 410 may comprise image data from the first camera 312a and the second camera 312b that are acquired at the same time. For example, a first pair of images 410a may be acquired at time t 1 and a second pair of images 410b may be acquired at time t 2. Some or all of the image data and/or audio data may be sent to the user device 110 for output thereon, although the disclosure is not limited thereto.

During operation the motile device 112 may determine input data. The input data may include or be based at least in part on sensor data from the sensors 114 onboard the motile device 112. In one implementation, a speech processing component (which may include speech-processing component(s) illustrated in FIG. 2) may process raw audio data obtained by a microphone on the motile device 112 and produce input data. For example, the user may say "Echo, come here" which may produce input data "come here". In another implementation, the input data may comprise information such as a command provided by another computing device, such as a smartphone or tablet computer.

Figure 18:
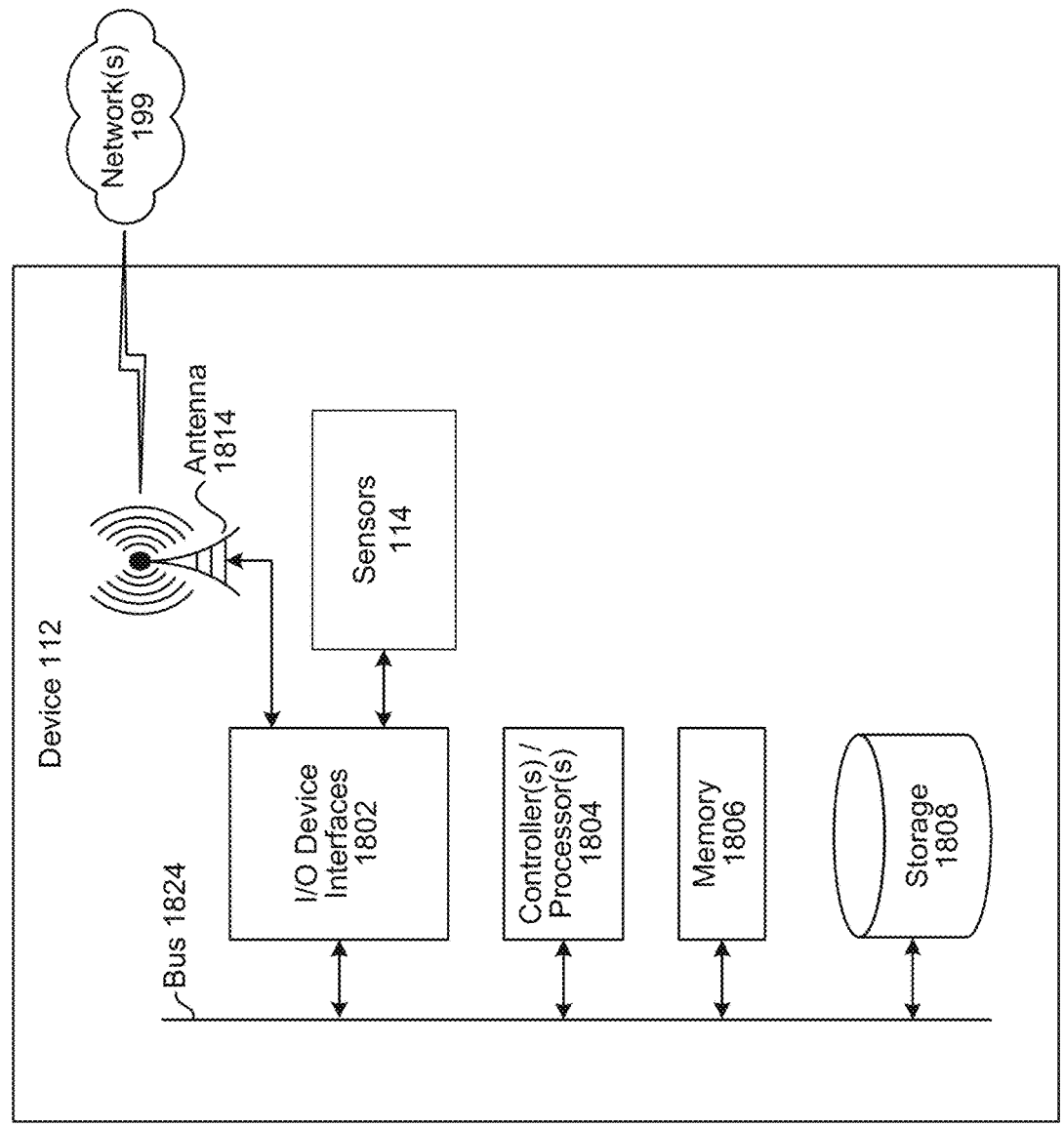
FIG. 18 is a block diagram conceptually illustrating example components of a device according to embodiments of the present disclosure.

A mapping component (which may be included in memory 1806 as illustrated in FIG. 18) determines a representation of the environment 102 that includes the obstacles 383 and their location in the environment 102. During operation the mapping component uses the sensor data from various sensors 114 to determine information such as where the motile device 112 is, how far the motile device 112 has moved, the presence of obstacles 383, where those obstacles 383 are, where a user is located (in conjunction with user recognition component 295), and so forth.

Figure 5:
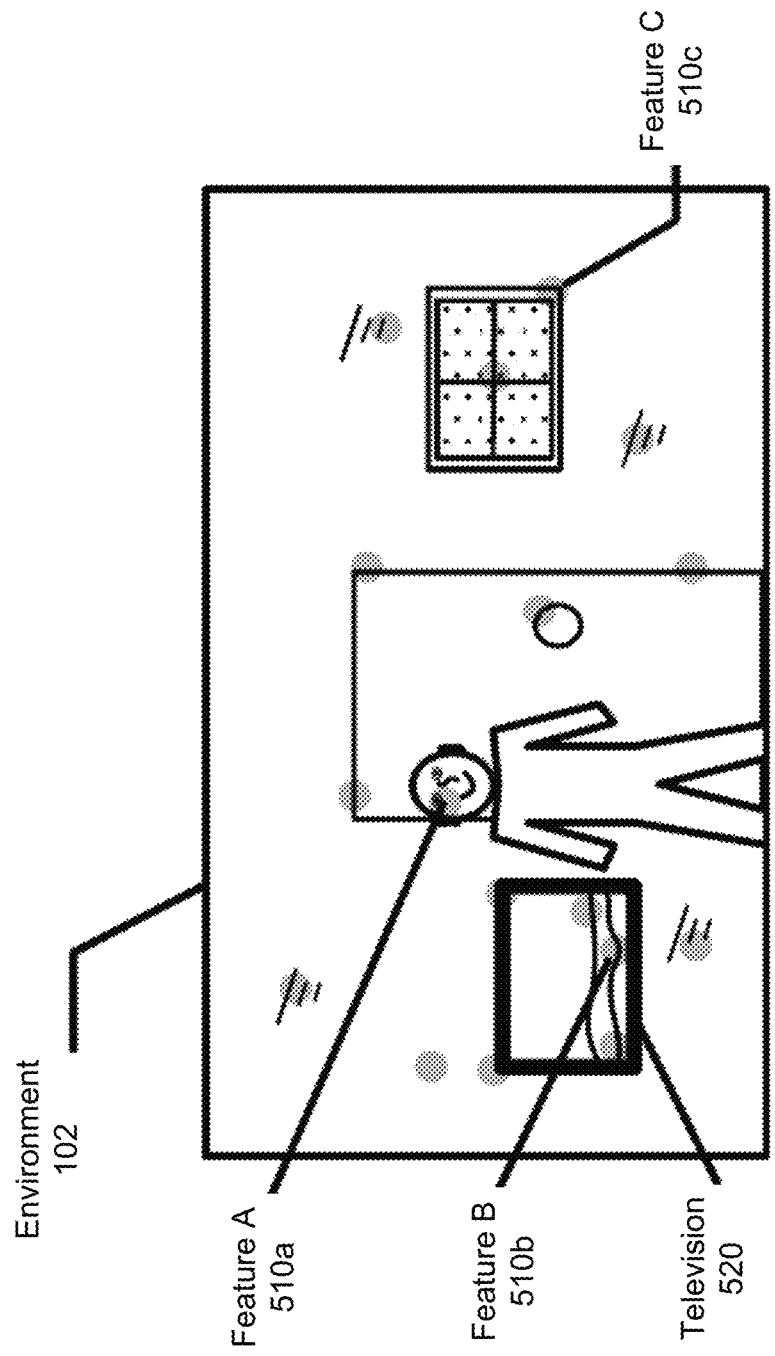

A feature module processes at least a portion of the image data to determine first feature data. The first feature data is indicative of one or more features 510 that are depicted in the image data. For example, as shown in FIG. 5, the features 510 may be edges of doors, shadows on the wall, texture on the walls, portions of artwork in the environment 102, and so forth. The environment 102 may include display devices that are capable of changing the images they portray. For example, a television 520 may be presented in the environment 102. The picture presented by the television 520 may also have features 510.

Various techniques may be used to determine the presence of features 510 in image data. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 510 in the image data. A feature 510 that has been detected may have an associated descriptor that characterizes that feature 510. The descriptor may comprise a vector value in some implementations. For example, the descriptor may comprise data indicative of the feature with respect to 256 different dimensions.

The first feature data may comprise information such the descriptor for the feature 510, the images that the feature 510 was detected in, location in the image data of the feature 510, and so forth. For example, the first feature data may indicate that in a first image the feature 510 is centered at row 994, column 312 in the first image. These data and operations, along with those discussed below, may be used by the motile device 112, and/or other devices, to perform the operations described herein.

Figure 6:
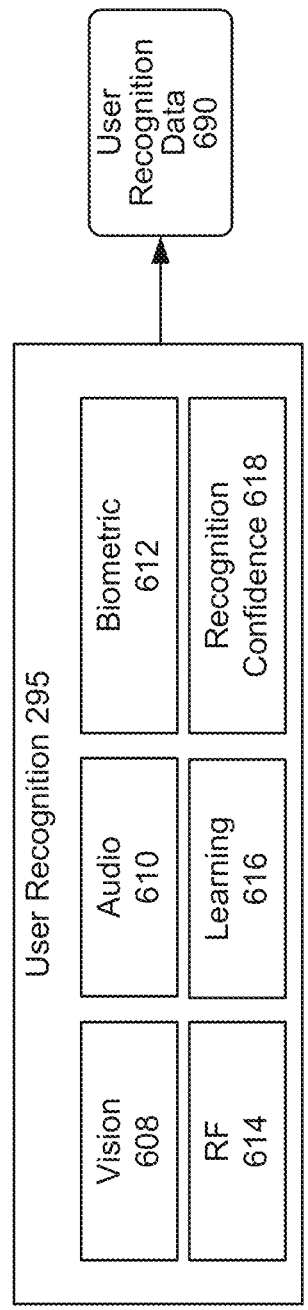
FIG. 6 is a schematic diagram of an illustrative architecture in which sensor data is combined to recognize one or more users, in accordance with embodiments of the present disclosure.

FIG. 6 is a schematic diagram of an illustrative architecture in which sensor data is combined to recognize one or more users, in accordance with embodiments of the present disclosure. As described above, the system 120 may include a user recognition component 295. The user recognition component 295 may recognize one or more users using a variety of data.

As illustrated in FIG. 6, the user recognition component 295 may include one or more subcomponents including a vision component 608, an audio component 610, a biometric component 612, a radio frequency (RF) component 614, a learning component 616, and a recognition confidence component 618. In some instances, the user recognition component 295 may monitor data and determinations from one or more subcomponents to recognize an identity of one or more users associated with data input to the system 120. The user recognition component 295 may output user recognition data 690, which may include a user identifier associated with a user the user recognition component 295 believes originated data input to the system 120. The user recognition component 295 may be used to inform processes performed by various components of the system 120 as described herein.

The vision component 608 may receive data from one or more sensors 114 capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user recognition component 295 may use determinations from additional components to determine an identity of a user. The vision component 608 can be used in conjunction with other components to determine an identity of a user. For example, the user recognition component 295 may use data from the vision component 608 with data from the audio component 610 to identify what user's face appears to be speaking at the same time audio is captured by a device 112 the user is facing for purposes of identifying a user who spoke an input to the system 120.

The overall system of the present disclosure may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user. Biometric information output by the biometric component 612 can be associated with specific user profile data such that the biometric information uniquely identifies a user profile of a user.

The RF component 614 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, a device 112 may include some RF or other detection processing capabilities so that a user who speaks an input may scan, tap, or otherwise acknowledge the user's personal device (such as a phone) to the device 112. In this manner, the user may "register" with the NPL system 120 for purposes of the system 120 determining who spoke a particular input. Such a registration may occur prior to, during, or after speaking of an input.

The learning component 616 may track the behavior of various users as a factor in determining a confidence level of the identity of the user. By way of example, a user may adhere to a regular schedule such that the user is at a first location during the day (e.g., at work or at school). In this example, the learning component 616 would factor in past behavior and/or trends in determining the identity of the user that provided input to the system 120. Thus, the learning component 616 may use historical data and/or usage patterns over time to increase or decrease a confidence level of an identity of a user.

In at least some instances, the recognition confidence component 618 receives determinations from the various components 608, 610, 612, 614, and 616, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 295.

The audio component 610 may receive data from one or more sensors capable of providing an audio signal (e.g., one or more microphones) to facilitate recognition of a user. The audio component 610 may perform audio recognition on an audio signal to determine an identity of the user and associated user identifier. In some instances, aspects of the system 120 may be configured at a computing device (e.g., a local server). Thus, in some instances, the audio component 610 operating on a computing device may analyze all sound to facilitate recognition of a user. In some instances, the audio component 610 may perform voice recognition to determine an identity of a user.

The audio component 610 may also perform user identification based on audio data 211 input into the system 120 for speech processing. The audio component 610 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 610 may perform user recognition by comparing speech characteristics represented in the audio data 211 to stored speech characteristics of users (e.g., stored voice profiles associated with the device 112 that captured the spoken user input).

Figure 7:
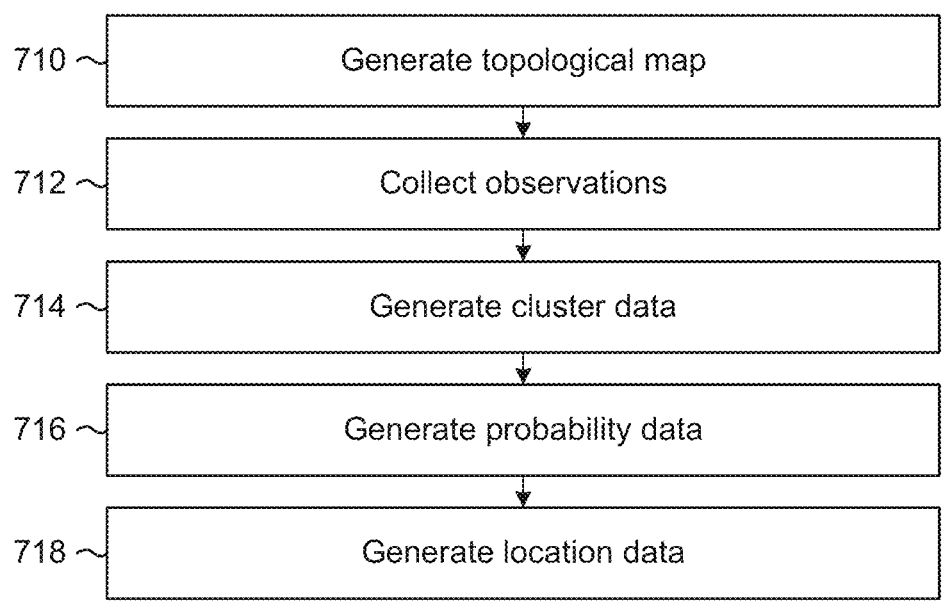
FIG. 7 is a flowchart conceptually illustrating a method for generating location data according to embodiments of the present disclosure.

FIG. 7 is a flowchart conceptually illustrating a method for generating location data according to embodiments of the present disclosure. The system 100 may perform a series of discrete steps to generate the location data, and these steps may be performed simultaneously and/or separately without departing from the disclosure.

As illustrated in FIG. 7, the system 100 may generate (710) a topological map of an environment, as will be described in greater detail below with regard to FIGS. 8A-9B. For example, the environment may correspond to one or more rooms within a building (e.g., residence, business, etc.) and the topological map may identify a rough outline of the building, one or more rooms within the building, furniture or other objects within the one or more rooms, and/or the like without departing from the disclosure. In some examples, the topological map may include detailed measurements and/or dimensions of the one or more rooms and/or the building, although the disclosure is not limited thereto.

The system 100 may generate the topological map using multiple techniques without departing from the disclosure. For example, FIGS. 8A-8B illustrate examples of a motile device 112 generating the topological map using sensor data, measurement data, and/or the like. However, the disclosure is not limited thereto and in some examples the system 100 may generate the topological map using one or more devices 110 without departing from the disclosure. For example, the system 100 may use acoustic beamforming and/or other acoustic properties to identify acoustically reflective surfaces (e.g., walls, furniture, objects, etc.) around each device 110, an approximate location of the acoustically reflective surfaces relative to the device 110, an approximate distance and/or direction between a pair of devices 110, and/or the like. Thus, a plurality of devices 110 located within the environment may piece together the topological map without departing from the disclosure.

The system 100 may collect (712) observations associated with human presence. For example, the system 100 may track a location of a user and store observation data that associates a corresponding user profile with the location of the user over time. Thus, the system 100 may store observation data for each individual user profile and the observation data may indicate an exact position within the environment of the user at various times. As used herein, the observation data may be referred to simply as data (e.g., first data, second data, etc.), and may correspond to a single observation and/or multiple observations without departing from the disclosure. For example, the system 100 may generate first data representing a first plurality of observations during a first time period, generate second data representing one or more observations during a second time period, and then generate third data that represents a second plurality of observations and includes the first data and the second data without departing from the disclosure.

The system 100 may use one or more devices 110/112 to identify the location of the user relative to the device 110/112. In some examples, the device 110/112 may be stationary and the system 100 may associate a fixed location with the device 110/112. For example, the system 100 may determine the fixed location using sensor data (e.g., location sensor data, such as Global Positioning System (GPS) data), wireless signals (e.g., (Ultra)-Sound signals, Bluetooth, etc.), wireless network data (e.g., wireless communication networks in range, such as WiFi, Long Term Evolution (LTE) network, WiMAX network, 3G network, 4G network, 5G network, etc.), audio processing (e.g., beamforming relative to other devices), image processing (e.g., object recognition and/or the like), and/or a combination thereof without departing from the disclosure. However, the disclosure is not limited thereto and instead of being associated with a fixed location, in some examples the device 110/112 may determine a current location without departing from the disclosure. Additionally or alternatively, the device 112 may be a motile device capable of moving within the environment independently of the user without departing from the disclosure.

The system 100 may identify the location of the user relative to the one or more devices 110/112 by remotely sensing (e.g., direct observations) the user using various techniques known to one of skill in the art, including sound localization (e.g., audio beamforming), audio processing (e.g., speech recognition), image processing (e.g., facial recognition, object recognition, and/or the like), sensor data (e.g., sensors configured to detect human presence, measure distance(s), and/or the like), and/or the like without departing from the disclosure. While in some examples the system 100 may track a location of the user using tracking data associated with a mobile device (e.g., smartphone and/or wearable device associated with the user), the tracking data is not an example of remotely sensing the user and is not included in the observation data. Thus, while the system 100 may supplement the observation data with the tracking data, the observation data corresponds to the devices 110/112 individually detecting a location associated with a specific user.

As part of generating an observation, the system 100 may transform first coordinate data (e.g., relative coordinates) representing a position of the user relative to the device 110/112 to second coordinate data (e.g., global coordinates) representing a location of the user within the topological map (e.g., environment). Thus, the system 100 may translate from relative distance and/or direction from the device 110/112 to a fixed position within the environment.

The system 100 may generate (714) cluster data using the observations (e.g., observation data). For example, the system 100 may process the observation data using a clustering algorithm to try to fit the observation data into multiple normal distributions. To illustrate an example, the system 100 may use a first clustering algorithm, such as a Gaussian Mixture Model (GMM) fit to an Expectation-Maximization (EM) algorithm, to generate multi-modal probability distributions represented by cluster data. The cluster data may represent each individual probability distribution using a centroid (e.g., mean of coordinate data associated with the probability distribution) and variance (e.g., covariance data). For example, a first probability distribution may be referred to as a first cluster and may be represented by a position of the mean (e.g., x and y coordinates within the topological map that correspond to the mean of coordinate data associated with the first cluster) and a covariance matrix (e.g., 2×2 matrix describing the covariance of the first cluster).

In some examples, instead of a Euclidean distance, the clustering algorithm can use a metric that takes into account the map and/or obstacles constraining the shortest paths between points on the map. The device 100/112 and/or the remote system 120 may process the observation data to generate the cluster data without departing from the disclosure.

The system 100 may generate (716) probability data using the cluster data and/or the observation data. For example, the system 100 may determine the probability values by comparing a number of observations associated with a particular cluster/location to a total number of observations. In some examples, the total number of observations corresponds to a total number of times that the system 100 detects that the user is present in the environment. Thus, the probability data indicates a likelihood that, if the user is present in the environment, the user is at a particular location. For example, the system 100 may identify six different clusters in the observation data and may determine six different probability values corresponding to the six different clusters, such that a first probability value indicates a likelihood that the user is in a first location associated with a first cluster, a second probability value indicates a likelihood that the user is in a second location associated with a second cluster, and so on. If the six clusters correspond to the total number of observations, the six probability values add up to a value of 1 (e.g., 100%).

The disclosure is not limited thereto, however, and in other examples the total number of observations corresponds to a total number of potential observations in which the user may be detected in the environment during a period of time, regardless of whether the user is actually detected. Thus, the probability data indicates a likelihood that the user is present in the environment at a particular location, taking into account the possibility that the user is not present in the environment. For example, the system 100 may determine a total number of potential observations based on a rate at which individual devices 110/112 detect presence of the user within the period of time.

To illustrate a first example corresponding to observation data generated by a single device 110/112, if a first device 110/112 detects a position of the user every minute (e.g., generates an observation 60 times an hour) and the period of time corresponds to a day (e.g., 24 hours), the system 100 may determine that the total number of potential observations is equal to 1440 observations (e.g., 60×24=1440 observations). To illustrate a second example corresponding to observation data generated by two devices 110/112, the system 100 may determine that the total number of potential observations is equal to 2880 observations (e.g., 2×60×24=1440 observations). However, the disclosure is not limited thereto and a rate at which the devices 110/112 detect the position of the user, a number of devices 110/112, and/or a length of the period of time may vary without departing from the disclosure. For example, the system 100 may determine the total number of potential observations based on k devices, with each device having varying rates of observation (e.g., human presence detection), for any period of time without departing from the disclosure. Further details regarding determining the probability data are described below with regard to FIGS. 13-15.

As described above, the observation data may include a total number of observations (e.g., number of samples), with a single observation indicating a specific location at which a specific user is detected during a specific time period, while the cluster data may indicate a location and/or area associated with a cluster. Thus, the cluster data does not indicate a first number of observations associated with a first cluster, but the system 100 may determine the first number of observations using the observation data. For example, the system 100 may use the location data (e.g., first area) associated with the first cluster to identify the first number of observations in which the user is detected within the first area. Thus, the system 100 may associated individual observations with a corresponding cluster and/or time period and generate the probability data accordingly.

The system 100 may generate (718) location data based on the probability data. The location data may indicate one or more locations having a highest likelihood (e.g., highest probability value) of the user being present at a given time. For example, the system 100 may output a single location having a highest probability value, may output n locations having the n highest probability values, and/or the like without departing from the disclosure.

In some examples, the system 100 may identify that a first cluster is associated with the most observations and may generate the location data indicating a first location associated with the first cluster. The system 100 may represent the first location using coordinates of a center of the first cluster (e.g., mean value of a plurality of coordinates associated with the observations that correspond to the first cluster), a range of coordinates encompassing an area of the first cluster (e.g., a list of blocks associated with the first cluster, a range of coordinate values indicating a perimeter of the first cluster, etc.), the coordinates of the center and a variance (e.g., covariance matrix) of the first cluster, and/or other techniques known to one of skill in the art.

The disclosure is not limited thereto, however, and in other examples the system 100 may generate location data corresponding to multiple locations without departing from the disclosure. For example, the system 100 may identify the n highest probability values, determine n clusters associated with the n highest probability values, determine n locations corresponding to the n clusters, and output the location data representing the n locations.

The location data indicates that the user is likely to be present within a specific area. In some examples, the location data may include a probability value indicating a likelihood that the user is present within the area, although the disclosure is not limited thereto. For example, if the location data indicates n best locations (e.g., n locations having the n highest probability values), the location data may include both the n locations and the n probability values.

In some examples, the device 112 may perform additional processing using the location data to select form the n best locations. Thus, the device 112 may use the location data to travel to different locations and determine whether the user is present. For example, the device 112 may select the highest probability value and choose a corresponding location (e.g., prioritize highest likelihood), may select a nearest location of the n best locations (e.g., prioritize least amount of travel time), may select multiple locations in proximity (e.g., if highest probability value is in a first direction, but multiple locations are in a second direction, travel in the second direction to check each of the multiple locations), may select a safest location of the n best locations (e.g., prioritize safety), and/or the like.

In some examples, the topological map may change over time without departing from the disclosure. If the change in the topological map is relatively small, the system 100 may transfer the observation data, the cluster data, and/or the probability data to the new topological map without departing from the disclosure. However, the system 100 may determine that the change in the topological map exceeds a threshold amount, in which case the system 100 may discard the observation data, the cluster data, and/or the probability data and recalculate based on new observations. Additionally or alternatively, the system 100 may receive a command to regenerate the topological map, the observation data, the cluster data, and/or the probability data without departing from the disclosure. For example, the user may input a command to reset, although the disclosure is not limited thereto.

In some examples, the system 100 may store an expiration date associated with the topological map, the observation data, the cluster data, and/or the probability data. Thus, when the system 100 determines that the expiration date has passed or expired, the system 100 may transfer, recalculate, and/or regenerate the topological map, the observation data, the cluster data, and/or the probability data without departing from the disclosure. For example, the system 100 may regenerate the topological map and transfer the observation data, the cluster data, and/or the probability data to the new topological map based on the expiration date. Additionally or alternatively, the system 100 may recalculate the cluster data based on the expiration date without departing from the disclosure.

FIGS. 8A-8B illustrate a representation of an environment 102 and a topological map of the environment according to embodiments of the present disclosure. Referring first to FIG. 8A, an example environment 102 includes three rooms 802, 804, 806. A first room 802 includes a kitchen countertop 808a and table and chairs 810a. A second room 804 includes bookshelves 812a and a desk 814a. A third room 806 includes a large couch 816a, a small couch 818a, and a wall-mounted television 820a. In this example environment 102, some objects (such as large couch 816a) extend from the floor of the environment 102 to a point between the ceiling and the floor; some objects (such as the television 820a) do not touch the floor; and other objects (such as bookshelves 812a) extend from floor to ceiling. The environment is bordered by exterior walls 822a and may include one or more interior walls 824a. The device 112 is capable of movement, as disclosed herein, within the environment 102. Environments 102, however, having any number of rooms and/or any types of objects are within the scope of the present disclosure.

FIG. 8B illustrates a map 800 (e.g., topological map) of the environment 102. The device 112 may generate the map 800 or may receive the map 800 from the system 120. The map 800 includes data representing the position 822b of exterior walls 822a and data representing the position 824b of interior walls 824a. The map data may be a set of (x,y) coordinates that indicate the positions 822b, 824b of the walls 822a, 824a with respect to a (0,0) origin point, such as a bottom-left point of the map 800. For example, if an exterior wall 822a extends from the (0,0) origin point to a point 10 meters to the right, the map data may include the coordinates (0,0)-(10,0).

The map 824 may further include data representing the positions 808b, 810b, 812b, 814b, 816b, 818b of the objects 808a, 810a, 812a, 814a, 816a, 818a, 820a. The data representing the positions 808b, 810b, 812b, 814b, 816b, 818b, 820b may similarly be a set of further (x,y) coordinates that represent the position and size of each object 808a, 810a, 812a, 814a, 816a, 818a, 820a in the environment 102 with respect to the (0,0) origin point. For example, if the large couch 816a has dimensions of 2 meter by 1 meters (e.g., 2 meters long along the y-axis, and 1 meter wide along the x-axis), and if it is positioned such that its lower-left corner is disposed at the grid point (10,1), the data representing its position may be (10,1)×(11, 3), denoting its lower-left corner and upper-right corner. Objects having more complicated shapes (with more than four sides) may be represented by additional sets of (x,y) coordinates, such that each pair of (x,y) coordinates defines a side of the object. Objects having curved or otherwise more complicated sides may be represented by data defining the curve, such as parameters defining an arc segment, or may be estimated as a set of straight lines.

The device 112 and/or system 120 may determine the map 800 by processing input data, such as image data or infrared data received from one or more cameras 312. The device 112 may move within the environment 102 while it captures the image data. In some embodiments, device 112 and/or system 120 processes the image data using image-processing techniques to determine objects therein and then determines the position data based thereon. For example, if the device 112 captures image data that includes a representation of the large couch 816a, the device 112 and/or system 120 may determine, based on a likely size of the large couch 816a, how far the large couch 816 is from the device 112 and base the (x,y) coordinates of the representation of the large couch 816b thereon. In other embodiments, the device 112 and/or system 120 uses the multiple cameras to capture binocular images of the environment 102 and, based on a known distance between the multiple cameras, determines the distance between the device 112 and an object depicted in the binocular images. Any method of determining the coordinates of the positions 822b, 824b of the walls 822a, 824a and the positions 808b, 810b, 812b, 814b, 816b, 818b, 820b of the objects 808a, 810a, 812a, 814a, 816a, 818a, 820a is within the scope of the present disclosure.

The map data may further include a grid made up of grid units 828. If the map data does not include the grid, the device 112 may create the grid. Each grid unit may have dimensions of any size, such as 100 centimeters length and width. The grid units need not be square and need not be all the same size; they may be, for example hexagonal. The system 120 and/or device 112 may create the grid by beginning at the (0,0) origin point and placing grid tiles adjacent in the positive x- and y-dimensions. In other embodiments, the system 120 and/or device 112 may determine the length and width of each grid unit by determining the length and width of the map 800 and/or rooms 802, 804, 806 and dividing by an integer, such as ten, so that no fractionally-sized grid units 828 are needed to fully populate the map 800 with the grid units 828.

When the device 112 determines a direction and distance of movement associated with a user input, as described herein, it may determine its position on the map 800 and plot the distance in the direction. If an obstruction intersects with the plotted path, the device 112 may truncate its path to avoid hitting the obstruction, alter the path around the obstruction, or refuse to move altogether. The device 112 may send an indication of failure to the user device 110.

Figure 9A:
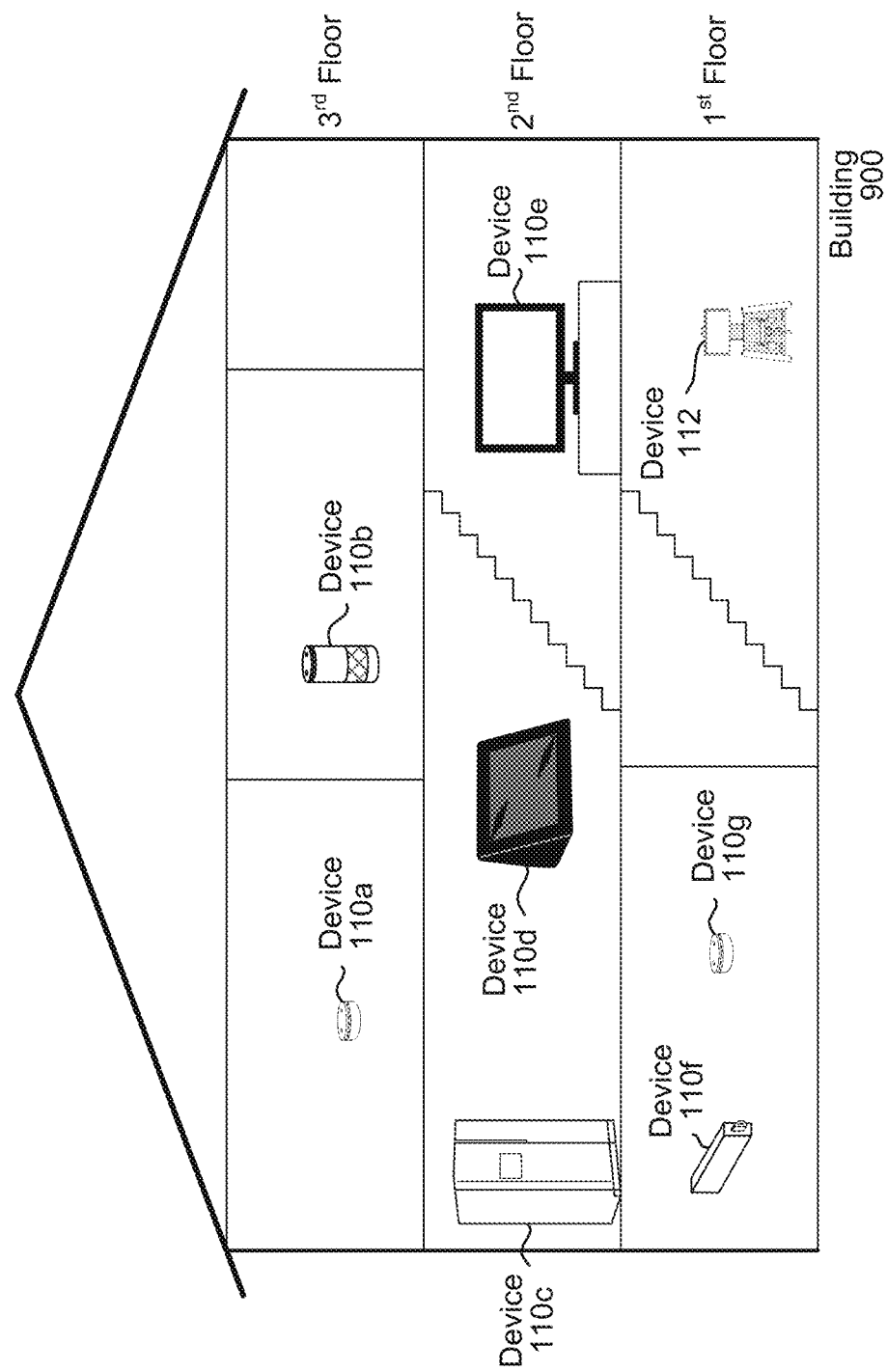

FIGS. 9A-9B illustrate examples of an environment and devices within the environment according to embodiments of the present disclosure. While the examples illustrated above describe the device 112 generating the topological map, the disclosure is not limited thereto and in some examples the system 100 may generate the topological map using one or more devices 110 included in an environment such as a building. However, a first topological map generated using the device 112 may be different than a second topological map generated using one or more devices 110 the without departing from the disclosure. For example, a granularity (e.g., resolution) of the second topological map may be less than the first topological map, the first topological map may include objects (e.g., furniture, walls, etc.) that are omitted from the second topological map, and/or the like without departing from the disclosure. For example, the second topological map may simply represent an environment as separate zones without dimensions, providing the system 100 a general approximation of groups of devices 110 (e.g., multiple devices in proximity to each other within a single room), relative distances between the devices 110, and/or additional information about the environment (e.g., number of rooms, etc.).

As illustrated in FIG. 9A, a building 900 may include multiple stories (e.g., three stories) split between multiple rooms. A plurality of devices 110a-110g and/or one or more device 112 may be distributed throughout the building 900 and the system 100 may generate the topological map using input data received from the plurality of devices 110a-110g and/or one or more device 112. For example, the devices 110 may communicate with each other using wireless protocols (e.g., WiFi, Bluetooth, etc.), audio signals (e.g., send and receive audio data between devices 110 within proximity to each other), and/or the like and may identify relative distances between the devices 110. Additionally or alternatively, the devices 110 may identify other devices 110 using object recognition (e.g., identify the device 110 in image data captured by a camera), audio processing (e.g., beamforming and other audio localization), and/or the like.

As illustrated in FIG. 9B, a device map 910 illustrates a layout of a single story of the building 900 that includes multiple devices 110 and a device 112. For example, a first speech-enabled device 110a may be located in an office area, a second speech-enabled device 110b may be located on a table in a living room area, a third speech-enabled device 110c may be located on a counter in a kitchen area, a fourth device 110d may be connected to a television in the living room area, and a device 112 may be located in the kitchen area. In the device map 910 illustrated in FIG. 9B, two or more devices 110 may be in proximity to each other, enabling the devices 110 to detect audio generated by other devices 110. For example, the first device 110a may detect audio generated by the second device 110b, the third device 110c, and/or the fourth device 110d without departing from the disclosure. Thus, the system 100 may use the devices 110 and techniques known to one of skill in the art generate an approximation of the layout (e.g., topological map). However, while FIG. 9B illustrates a specific example of four devices 110 in proximity to each other, the disclosure is not limited thereto and a number and/or type of devices 110 may vary without departing from the disclosure.

FIG. 10 illustrates examples of observations generated by one or more devices according to embodiments of the present disclosure. In some examples, the system 100 may receive observation data generated by the device(s) 110 and/or device 112 that may represent observations 1010. For example, a first observation 1010a may correspond to a first location of the user at a first time, a second observation 1010b may correspond to a second location of the user at a second time, and so on. Thus, the observation data may track a location of the user over time.

The observation data may be associated with an individual user profile. Thus, each user may be separately tracked using unique observation data associated with a corresponding user profile. In some examples, the system 100 may determine an estimated location of a user based only on observation data associated with a corresponding user profile. However, the disclosure is not limited thereto and in some examples the system 100 may combine observation data associated with separate user profiles and determine an estimated location based on the combined observation data without departing from the disclosure.

Figure 11:
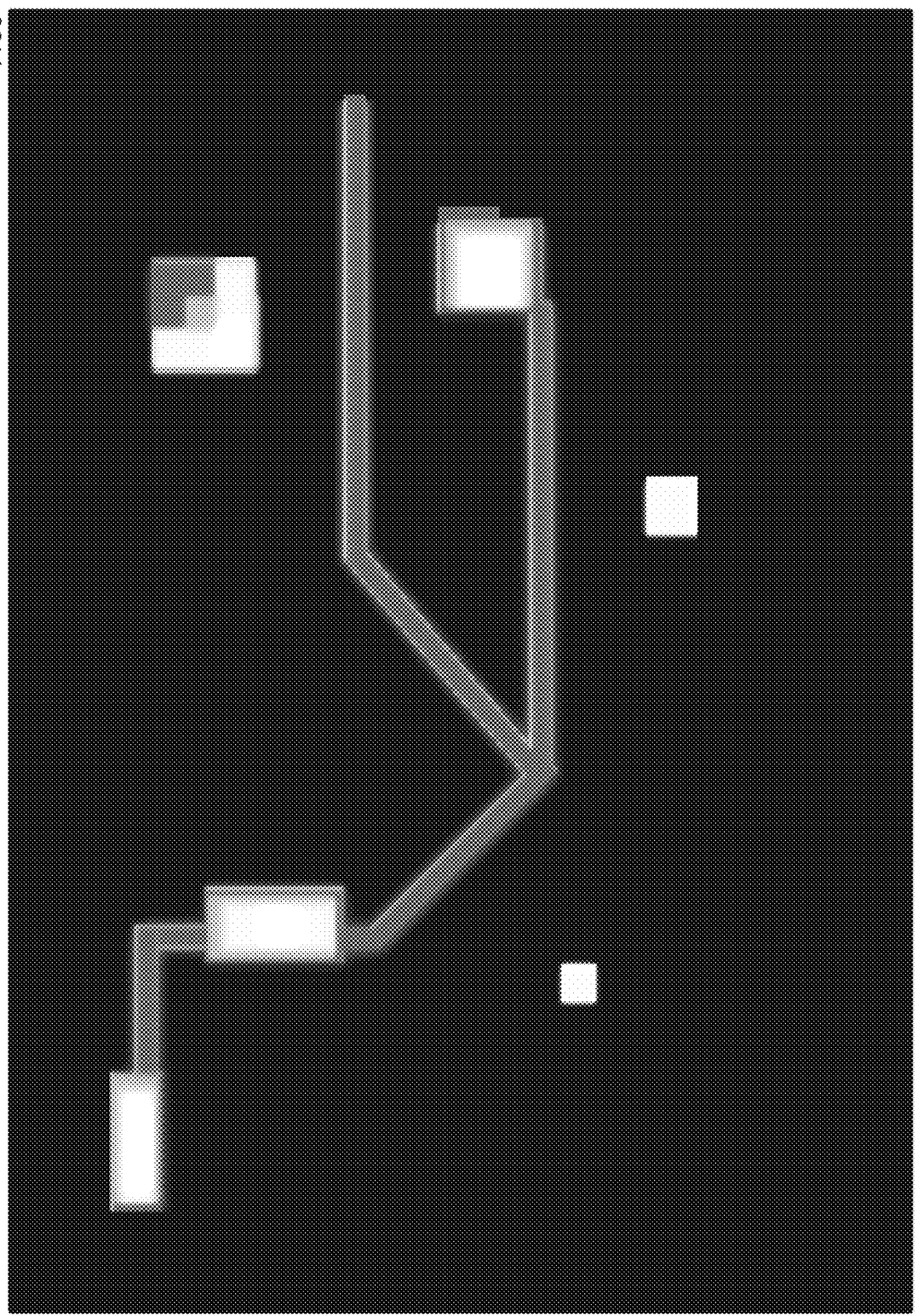
FIG. 11 illustrates an example of a heatmap generated using observation data according to embodiments of the present disclosure.

FIG. 11 illustrates an example of a heatmap generated using observation data according to embodiments of the present disclosure. In some examples, the system 100 may generate a heatmap 1100 using the observation data, although the disclosure is not limited thereto. For example, the system 100 may process the observations represented by the observation data to generate the heatmap 1100 to illustrate a relative frequency of human presence at particular locations for a particular user profile. As illustrated in FIG. 11, the heatmap 1100 indicates that the user associated with the user profile is frequently detected in certain locations, such as a first location corresponding to a sink in the kitchen area, a second location corresponding to the oven in the kitchen area, a third location corresponding to a desk in the office area, a fourth location corresponding to a small couch in the living room area, a fifth location corresponding to a large couch in the living room area, and a sixth location corresponding to a kitchen table in the kitchen area. In addition, the heatmap 1100 indicates a slightly higher frequency of observations along paths between these locations.

Based on the heatmap 1100, the system 100 may estimate a current position of the user at a particular time. For example, as the user spends more time in the six locations indicated by the heatmap 1100, the system 100 may determine a first probability value that the user is present in one of the six locations (e.g., areas represented as white in the heatmap 1100) that is higher than a second probability value associated with other locations (e.g., areas represented as black in the heatmap 1100).

As will be described in greater detail below, the system 100 may determine the probability values by comparing a number of observations associated with a particular location to a total number of observations. The system 100 may then generate location data indicating one or more of the locations having highest probability values of the potential locations. For example, the system 100 may output a single location having a highest probability value, may output n locations having the n highest probability values, and/or the like without departing from the disclosure.

While FIG. 11 illustrates an example of a heatmap 1100, the disclosure is not limited thereto and the system 100 may generate cluster data without generating the heatmap 1100 without departing from the disclosure. Thus, the heatmap 1100 is provided to conceptually illustrate an example of observation data corresponding to a user profile. As described above, in some examples the observation data and the heatmap 1100 may correspond to a single user profile associated with a single user, although the disclosure is not limited thereto and the observation data and the heatmap 1100 may correspond to a single user profile associated with multiple users, multiple user profiles associated with a single user, multiple user profiles associated with multiple users, and/or the like without departing from the disclosure.

Additionally or alternatively, the observation data and/or the heatmap 1100 may vary based on a time of day or other context. For example, the observation data may track the location of the user throughout the day, may group observation data within time ranges (e.g., a first time range from 6 AM to 10 AM, a second time range from 10 AM to 2 PM, a third time range from 2 PM to 6 PM, a fourth time range from 6 PM to 8 PM, a fifth time range from 8 PM to 11 PM, and so on), and may generate separate heatmaps for each time range. To illustrate an example, the observation data may indicate that the user is frequently in the kitchen area (e.g., first location near the sink, second location near the oven, and/or the sixth location near the kitchen table) during the first time range (e.g., from 6 AM to 10 AM) and the fourth time range (e.g., from 6 PM to 8 PM), is frequently in the office area (e.g., third location near the desk) during the second time range and the third time range, and is frequently in the living room area (e.g., fourth location near the small couch and/or fifth location near the large couch) during the fifth time range (e.g., from 8 PM to 11 PM). Thus, the system 100 may generate separate heatmaps for each unique time range and/or group of time ranges without departing from the disclosure.

As illustrated in the example time ranges listed above, a length of the time ranges may vary without departing from the disclosure. Thus, the system 100 may detect trends in the observation data and group the observation data based on the trends. For example, the observation data may indicate that the user is frequently detected in the office area during a first time window (e.g., during the afternoon), in the kitchen area during a second time window (e.g., around dinner time), and then in the living room area during a third time window (e.g., during the evening). Thus, the system 100 may set first parameters for the third time range (e.g., begin at 2 PM, end at 6 PM) based on the first time window, second parameters for the fourth time range (e.g., begin at 6 PM, end at 8 PM) based on the second time window, and third parameters for the fifth time range (e.g., begin at 8 PM, end at 10 PM) based on the third time window. However, the parameters described above are intended as an example and the disclosure is not limited thereto. Additionally or alternatively, the system 100 may use a uniform length of time for each of the time ranges without departing from the disclosure.

Figure 12:
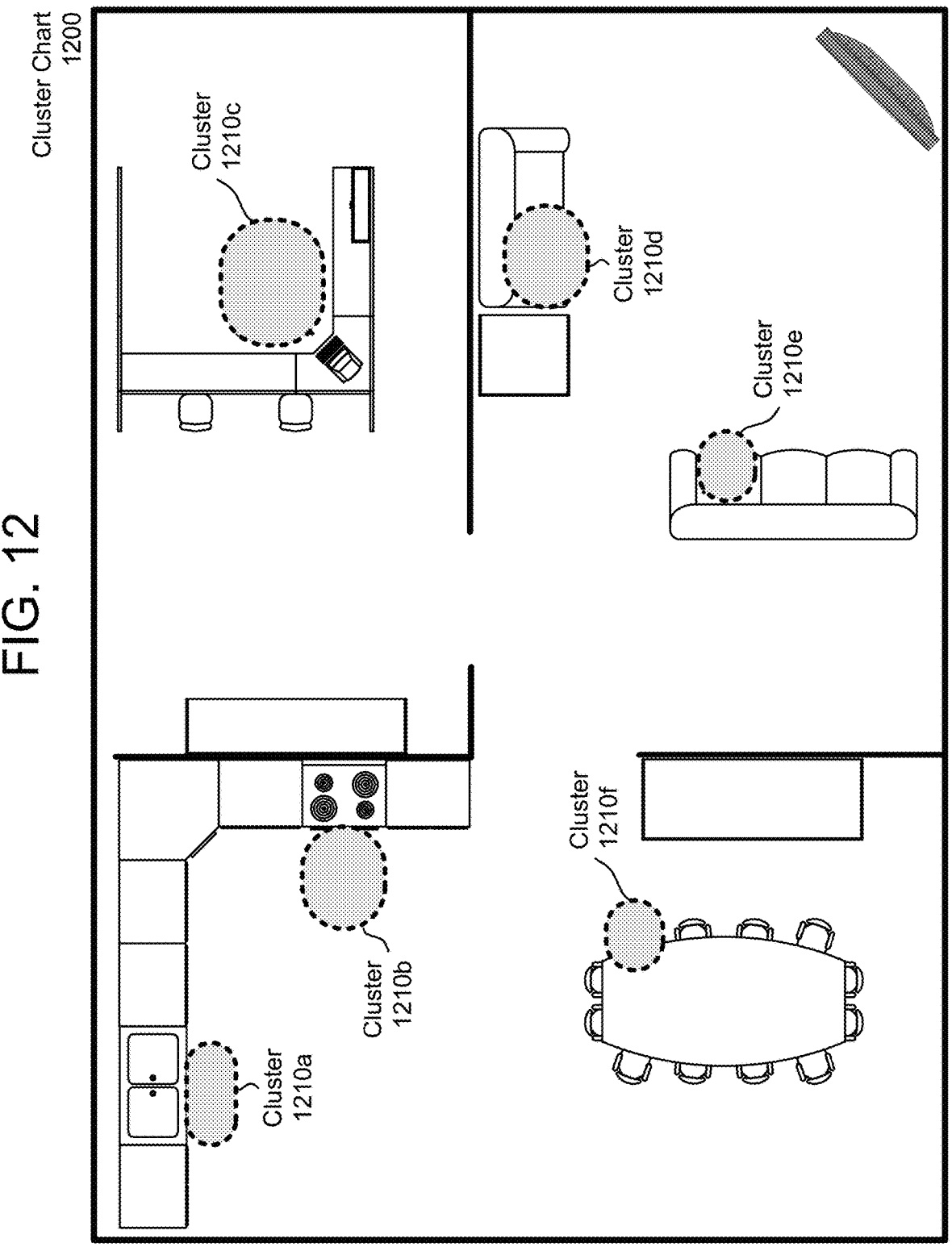
FIG. 12 illustrates an example of cluster data generated using observation data according to embodiments of the present disclosure.

FIG. 12 illustrates an example of cluster data generated using observation data according to embodiments of the present disclosure. As illustrated in FIG. 12, the system 100 may process the observation data to generate cluster data illustrated in cluster chart 1200. For example, the system 100 may process the observations represented by the observation data using a clustering algorithm to identify individual clusters (e.g., probability distributions) of observations. To illustrate an example, the system 100 may use a first clustering algorithm, such as a Gaussian Mixture Model (GMM) fit to an Expectation-Maximization (EM) algorithm, to generate multi-modal probability distributions represented by cluster data. The cluster data may represent each individual probability distribution using a centroid (e.g., mean of coordinate data associated with the probability distribution) and variance (e.g., covariance data). For example, a first probability distribution may be referred to as a first cluster and may be represented by a position of the mean (e.g., x and y coordinates within the topological map that correspond to the mean of coordinate data associated with the first cluster) and a covariance matrix (e.g., 2×2 matrix describing the covariance of the first cluster).

As illustrated in FIG. 12, the cluster chart 1200 separates the observations into six different clusters, indicating that the user associated with the user profile is frequently detected in six separate locations. For example, a first cluster 1210$a$ corresponds to a first location near the sink in the kitchen area, a second cluster 1210$b$ corresponds to a second location near the oven in the kitchen area, a third cluster 1210$c$ corresponds to a third location near the desk in the office area, a fourth cluster 1210$d$ corresponds to a fourth location near a small couch in the living room area, a fifth cluster 1210$e$ corresponds to a fifth location near a large couch in the living room area, and sixth cluster 1210$f$ corresponds to a sixth location near a kitchen table in the kitchen area. While not illustrated in FIG. 12, the cluster data may include smaller clusters associated with sporadic observations without departing from the disclosure.

Based on the cluster data, the system 100 may estimate a current position of the user at a particular time. For example, as the user spends more time in the six locations indicated by the cluster chart 1200, the system 100 may determine a first probability value that the user is present at the first location associated with the first cluster 1210$a$, a second probability value that the user is present at the second location associated with the second cluster 1210$b$, a third probability value that the user is present at the third location associated with the third cluster 1210$c$, a fourth probability value that the user is present at the fourth location associated with the fourth cluster 1210$d$, a fifth probability value that the user is present at the fifth location associated with the fifth cluster 1210$e$, and a sixth probability value that the user is present at the sixth location associated with the sixth cluster 1210$f$.

While FIG. 12 illustrates an example of the cluster chart 1200, the disclosure is not limited thereto and the cluster data may vary without departing from the disclosure. As described above, in some examples the observation data and the cluster data may correspond to a single user profile associated with a single user, although the disclosure is not limited thereto and the observation data and the cluster data may correspond to a single user profile associated with multiple users, multiple user profiles associated with a single user, multiple user profiles associated with multiple users, and/or the like without departing from the disclosure. Thus, the system 100 may individually track each user and store observation data and/or generate cluster data for a single user profile, multiple user profiles, a combination of individual user profiles and a shared user profile, and/or the like without departing from the disclosure.

Additionally or alternatively, the observation data and/or the cluster data may vary based on a time of day or other context. For example, the observation data may track the location of the user throughout the day, may group observation data within time ranges (e.g., a first time range from 6 AM to 10 AM, a second time range from 10 AM to 2 PM, a third time range from 2 PM to 6 PM, a fourth time range from 6 PM to 8 PM, a fifth time range from 8 PM to 11 PM, and so on), and may generate separate cluster data for each time range. To illustrate an example, the observation data may indicate that the user is frequently in the kitchen area (e.g., first location near the sink, second location near the oven, and/or the sixth location near the kitchen table) during the first time range (e.g., from 6 AM to 10 AM) and the fourth time range (e.g., from 6 PM to 8 PM), is frequently in the office area (e.g., third location near the desk) during the second time range and the third time range, and is frequently in the living room area (e.g., fourth location near the small couch and/or fifth location near the large couch) during the fifth time range (e.g., from 8 PM to 11 PM). Thus, the system 100 may generate separate cluster data for each unique time range and/or group of time ranges without departing from the disclosure.

As illustrated in the example time ranges listed above, a length of the time ranges may vary without departing from the disclosure. Thus, the system 100 may detect trends in the observation data and group the observation data based on the trends. For example, the observation data may indicate that the user is frequently detected in the office area during a first time window (e.g., during the afternoon), in the kitchen area during a second time window (e.g., around dinner time), and then in the living room area during a third time window (e.g., during the evening). Thus, the system 100 may set first parameters for the third time range (e.g., begin at 2 PM, end at 6 PM) based on the first time window, second parameters for the fourth time range (e.g., begin at 6 PM, end at 8 PM) based on the second time window, and third parameters for the fifth time range (e.g., begin at 8 PM, end at 10 PM) based on the third time window. However, the parameters described above are intended as an example and the disclosure is not limited thereto. Additionally or alternatively, the system 100 may use a uniform length of time for each of the time ranges without departing from the disclosure.

Figure 13:
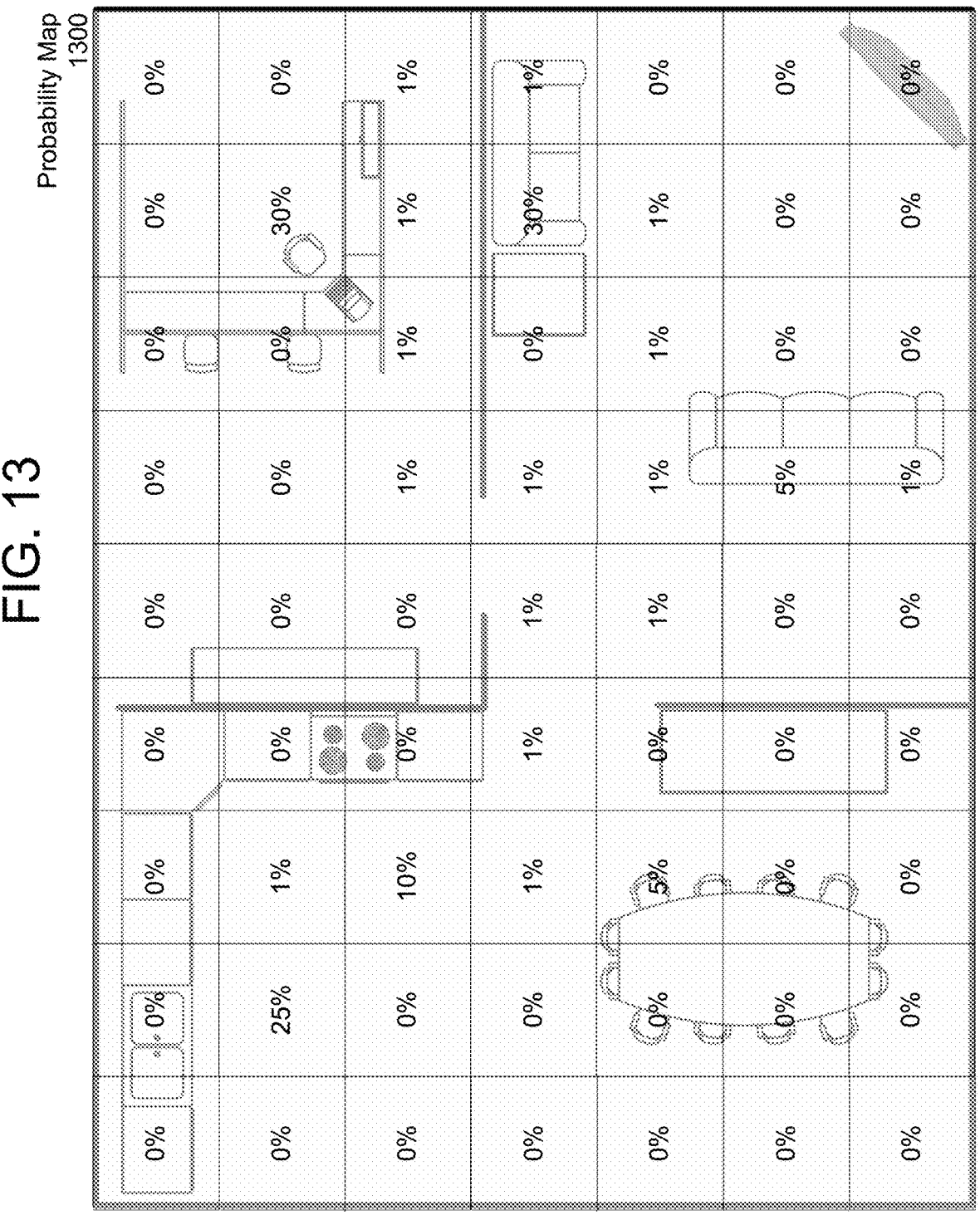
FIG. 13 illustrates an example of probability data generated using cluster data according to embodiments of the present disclosure.

FIG. 13 illustrates an example of probability data generated using cluster data according to embodiments of the present disclosure. As illustrated in FIG. 13, the system 100 may process the cluster data to generate probability data, represented by probability map 1300. For example, the system 100 may determine the probability values by comparing a number of observations associated with a particular cluster/location to a total number of observations.

For ease of illustration, the probability map 1300 indicates probability values (e.g., percentages) based on the assumption that the user is present in the environment, such that the total probability adds up to a value of 1.0 (e.g., 100%). Thus, the probability data is generated based on the total number of observations in which the user is present (e.g., if the user is present in the environment, what is the likely location of the user). However, the disclosure is not limited thereto and in some examples the system 100 may generate the probability data based on a total number of potential observations (e.g., the observation data includes observations when the user is not present in the environment) without departing from the disclosure. Thus, the cluster data may include observations that are not associated with a location within the environment to indicate that the user is not present.

As illustrated in FIG. 13, the probability map 1300 associates a probability value with a fixed area within the environment. For example, the system 100 may represent the environment using blocks of uniform size (e.g., square meter) and may generate individual probability values for each block. Thus, in some examples a single cluster may be spread across multiple blocks, and the system 100 may split the probability value based on the total number of blocks. However, this is intended for ease of illustration and the disclosure is not limited thereto. Instead, the system 100 may generate the probability value based on an individual cluster and may group the multiple blocks with the probability value without departing from the disclosure. For example, if the third cluster 1210c associated with the desk near the office area is spread amongst multiple blocks, the system 100 may generate a single probability value for the third cluster 1210c and associate the probability value with coordinates corresponding to the multiple blocks.

Using the probability data, the system 100 may generate location data indicating one or more of the locations having highest probability values of the potential locations. For example, the system 100 may output a single location having a highest probability value, may output n locations having the n highest probability values, and/or the like without departing from the disclosure.

FIG. 14 illustrates examples of location data according to embodiments of the present disclosure. As illustrated in FIG. 14, the system 100 may generate location data 1410 corresponding to a single location that has a highest probability value of potential locations. For example, the system 100 may identify that a first cluster is associated with the most observations and may generate the location data 1410 indicating a first location associated with the first cluster. The system 100 may represent the first location using coordinates of a center of the first cluster (e.g., mean value of a plurality of coordinates associated with the observations that correspond to the first cluster), a range of coordinates encompassing an area of the first cluster (e.g., a list of blocks associated with the first cluster, a range of coordinate values indicating a perimeter of the first cluster, etc.), the coordinates of the center and a variance (e.g., covariance matrix) of the first cluster, and/or other techniques known to one of skill in the art.

The system 100 may generate location data 1420 corresponding to multiple locations without departing from the disclosure. For example, the system 100 may identify the n highest probability values, determine n clusters associated with the n highest probability values, determine n locations corresponding to the n clusters, and output the location data 1420 representing the n locations. In the example illustrates in FIG. 14, the location data 1420 also includes the n highest probability values corresponding to the n locations, although the disclosure is not limited thereto.

As described above with regard to the location data 1410, the system 100 may represent a first location of a first cluster using first coordinates of a center of the first cluster (e.g., mean value) and a variance (e.g., covariance matrix). FIG. 14 illustrates an example of location data 1430 that separately indicates coordinates of the center, the covariance matrix, and the probability value for each of the n locations. For example, a first location (e.g., [Location A]) may be represented using first coordinates (e.g., [x1, y1]) and a first covariance matrix (e.g., [Matrix A], which may be a 2×2 matrix) and may be associated with a first probability value (e.g., [Probability A]).

As described above, the first probability value may represent a first likelihood that the user is present at the first location if the user is present within the environment (e.g., determined based on a total number of observations of the user), a second likelihood that the user is present at the first location without knowing that the user is present in the environment (e.g., determined based on a total number of possible observations, including when the user is not present), and/or the like without departing from the disclosure. Additionally or alternatively, the system 100 may include two or more probability values associated with a single location, such that the location data indicates both the first likelihood and the second likelihood without departing from the disclosure.

FIG. 15 illustrates examples of generating probability data according to embodiments of the present disclosure. In order to obtain presence probabilities while allowing the uncertainty of localizing the user (e.g., target) within the available topological map, the system 100 may perform normalization to generate the probabilities. Thus, the system 100 may determine a probability value for a first location by dividing a first number of observations for the first location by a total number of potential observations. For example, if a device 110/112 generates one observation per minute (e.g., detects a new position of the user every minute), the system 100 may determine the probability of the user being at the first location by dividing the first number of observations (e.g., number of times that the user is detected at the first location) by 1440 potential observations.

Observations of a target t (e.g., user) at a position i (e.g., coordinates within the topological map) by a device y at a position from which i is observable allow the system 100 to estimate the probability of the joint probability $P(t_i, y_i)$. For example, the joint probability $P(t_i, y_i)$ indicates a likelihood of the target t and the device y being in the same region (e.g., in proximity to each other near the position i). For ease of illustration, while the target t is detected at the exact position i, the device y may be associated with the position i regardless of a specific position of the device y so long as the device y may detect the target t (e.g., generate an observation). Thus, while the device y may be located at first coordinates and may detect the target t at second coordinates, the device y is considered to be at the position i for purposes of calculating the joint probability $P(t_i, y_i)$.

If the device y is associated with a fixed position (e.g., stationary device, such as device 110), the system 100 may determine the probability of the target t being at a particular location by comparing a first number of observations of the target t at the position i to a second number of total observations generated by the device y during a period of time. For example, if the target t is detected at the position i 120 times in a 24 hour period and the device y generates one observation per minute (e.g., detects a new position of the target t every minute), the system 100 may determine the probability of the target t being at the location i as equal to 0.083 or 8.3% (e.g., 120/(60*24)). Thus, observing the target t using a stationary device simplifies the process of calculating the presence probability for the target t.

If the device y is not associated with a fixed position (e.g., the device y is a motile device, such as device 112), the system 100 may determine the probability of the target t being at a particular location by marginalizing the joint probabilities according to:

$$(t_i) = \Sigma_k P(t_i, y_k) \quad [1]$$

$$P(t_i) = P(t_i, y_i) + \Sigma_{k \neq i} P(t_i, y_k) \quad [2]$$

$$P(t_i) = P(t_i, y_i) + P(t_i)[1 - P(y_i)] \quad [3]$$

$$P(t_i) = P(t_i, y_i)/P(y_i) \quad [4]$$

where $P(t_i)$ is the probability of the target t being at the position i, $y_k$ indicates that the device y is in position k when generating an observation, $P(t_i, y_i)$ is the joint probability of the target t being at the position i and the device y being in proximity to the position i, $P(y_i)$ indicates the probability of the device y being in proximity to the position i (e.g., being able to observe position i), and the complementary probability of $P(y_i)$ (e.g., $[1-P(y_i)]$) indicates the probability of the device y not being able to observe position i. Thus, the system 100 may determine the probability of the target t being at the position i based on the joint probability $P(t_i, y_i)$ and the probability of the device y being in position to observe position i (e.g., $P(y_i)$).

Equation [4] is illustrated in FIG. 15 as presence probability 1510. For stationary devices, the probability of the device y being in position to observe position i is equal to a value of one (e.g., $P(y_i)=1$), meaning that the complementary probability $[1-P(y_i)]$ is equal to a value of zero, and the probability of the target t being at the position i is equal to the joint probability $P(t_i, y_i)$.

In case of multiple devices y that are able to make possibly overlapping observations of the same target t, the system 100 may determine the probability value according to:

$$P(t_i)\Sigma_m \Sigma_{n \neq m} \Sigma_k [P(t_i, y_k^m) - P(t_i, y_k^m, y_k^n)]) \quad [5]$$

where P(t) is the probability of the target t being at the position i, $y_k^m$ indicates that a first device $y^m$ is in position k when generating an observation, and $y_k^n$ indicates that a second device $y^n$ is in position k when generating an observation. Equation [5] is illustrated in FIG. 15 as presence probability 1520. While the above description of Equation [5] illustrates an example involving two devices, the disclosure is not limited thereto and the system 120 may determine the presence probability 1520 using any number of devices without departing from the disclosure.

Figure 16B:
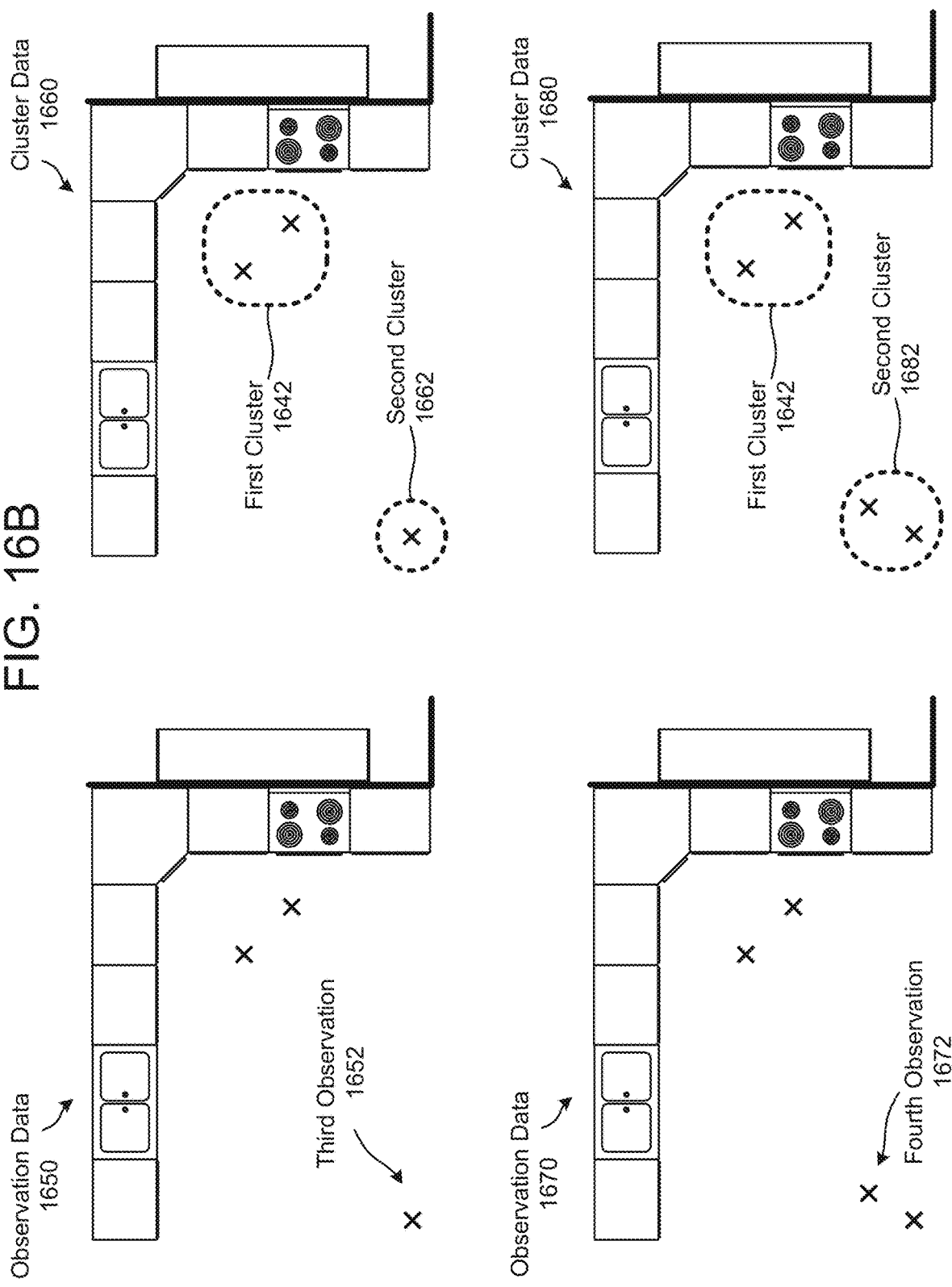

FIGS. 16A-16B illustrate examples of updating cluster data according to embodiments of the present disclosure. As described above, the system 100 may generate cluster data by processing observation data using a clustering algorithm. For example, the system 100 may receive observation data corresponding to a plurality of observations and may apply the clustering algorithm to generate the cluster data based on the plurality of observations. This corresponds to batch processing, in which the system 100 processes an entire batch (e.g., plurality of observations) at a time to generate the cluster data. When the system 100 receives additional observation data corresponding to individual observations, however, applying the clustering algorithm to the previously processed observation data is inefficient and increases a processing consumption associated with generating the cluster data.

To reduce a processing consumption, in some examples the system 100 may continuously process observation data by updating cluster data. For example, the system 100 may determine that a new observation corresponds to an existing cluster and may update parameters associated with the cluster (e.g., mean, variance, etc.) based on the new observation. Additionally or alternatively, the system 100 may determine that a new observation does not correspond to an existing cluster and may generate a new cluster based on the new observation.

As illustrated in FIG. 16A, the system 100 may receive and/or generate observation data 1610 that includes a first observation 1612 and may generate cluster data 1620 that includes a first cluster 1622 corresponding to the first observation 1612. For example, the system 100 may determine first parameters associated with the first cluster 1622, such as a first mean and first covariance, based on the first observation 1612.

The system 100 may then receive and/or generate observation data 1630 that includes the first observation 1612 and a second observation 1632 and may generate cluster data 1640 that includes a first cluster 1642 corresponding to the first observation 1612 and the second observation 1632. For example, the system 100 may update the first parameters to generate second parameters, such as a second mean and a second covariance, based on the first observation 1612 and the second observation 1632.

As illustrated in FIG. 16B, the system 100 may receive and/or generate observation data 1650 that includes the first observation 1612, the second observation 1632, and a third observation 1652 and may generate cluster data 1660 that includes the first cluster 1642 and a second cluster 1662 corresponding to the third observation 1652. For example, the system 100 may determine third parameters associated with the second cluster 1662, such as a third mean and third covariance, based on the third observation 1652.

The system 100 may then receive and/or generate observation data 1670 that includes the first observation 1612, the second observation 1632, the third observation 1652, and a fourth observation 1672 and may generate cluster data 1680 that includes the first cluster 1642 and a second cluster 1682 corresponding to the third observation 1652 and the fourth observation 1672. For example, the system 100 may update the third parameters to generate fourth parameters, such as a fourth mean and a fourth covariance, based on the third observation 1652 and the fourth observation 1672.

Thus, the system 100 may update parameters associated with existing clusters and/or add new clusters to the cluster data as new observations are generated and/or received. While FIGS. 16A-16B illustrate simplified examples of generating and updating clusters, the disclosure is not limited thereto and the clusters may include any number of observations without departing from the disclosure. In some examples, the system 100 may receive additional observations and may separate a single cluster to form two clusters. Additionally or alternatively, in addition to continuously processing observation data, the system 100 may perform batch processing periodically to generate cluster data based on the plurality of observations. For example, the system 100 may perform batch processing based on a first number of additional observations, periodically based on a duration of time, and/or the like without departing from the disclosure.

When the number of observations included in the observation data associated with a first user profile is below a minimum threshold value, the system 100 may generate presence probability values based on unrelated observation data. For example, the system 100 may determine first cluster data and/or first probability data based on observation data associated with the first user profile (e.g., historical observation data and/or observation data associated with other environments that corresponds to the first user profile), observation data associated with additional user profiles (e.g., historical observation data associated with the environment and/or observation data associated with other environments that does not correspond to the first user profile), and/or the like and may assign the first cluster data and/or the first probability data to the environment 102. In some examples, the system 100 may apply collaborative filtering techniques to assign areas with similar semantic tags and number of potential targets to determine probability value from all available datasets.

Thus, the system 100 may extend observation data, cluster data, and/or probability data from a first user profile to a second user profile, from a first environment (e.g., first topological map) to a second environment, and/or the like to generate generalized observation data, generalized cluster data, and/or generalized probability data that is not specific to the first user profile and/or the environment 102. Instead, the system 100 may use the generalized observation data, the generalized cluster data, and/or the generalized probability data to estimate a location of a user in a new environment.

The system 100 may continue using the generalized observation data, the generalized cluster data, and/or the generalized probability data until a number of observations associated with the environment 102 and/or the first user profile exceed the minimum threshold value, at which point the system 100 may estimate the location of the user using individual observation data, individual cluster data, and/or individual probability data associated with the first user profile and/or the environment 102. Thus, the generalized observation data, the generalized cluster data, and/or the generalized probability data may enable the system 100 to make a rough estimate of a location of the user until a sufficient number of new observations are generated.

Figure 17:
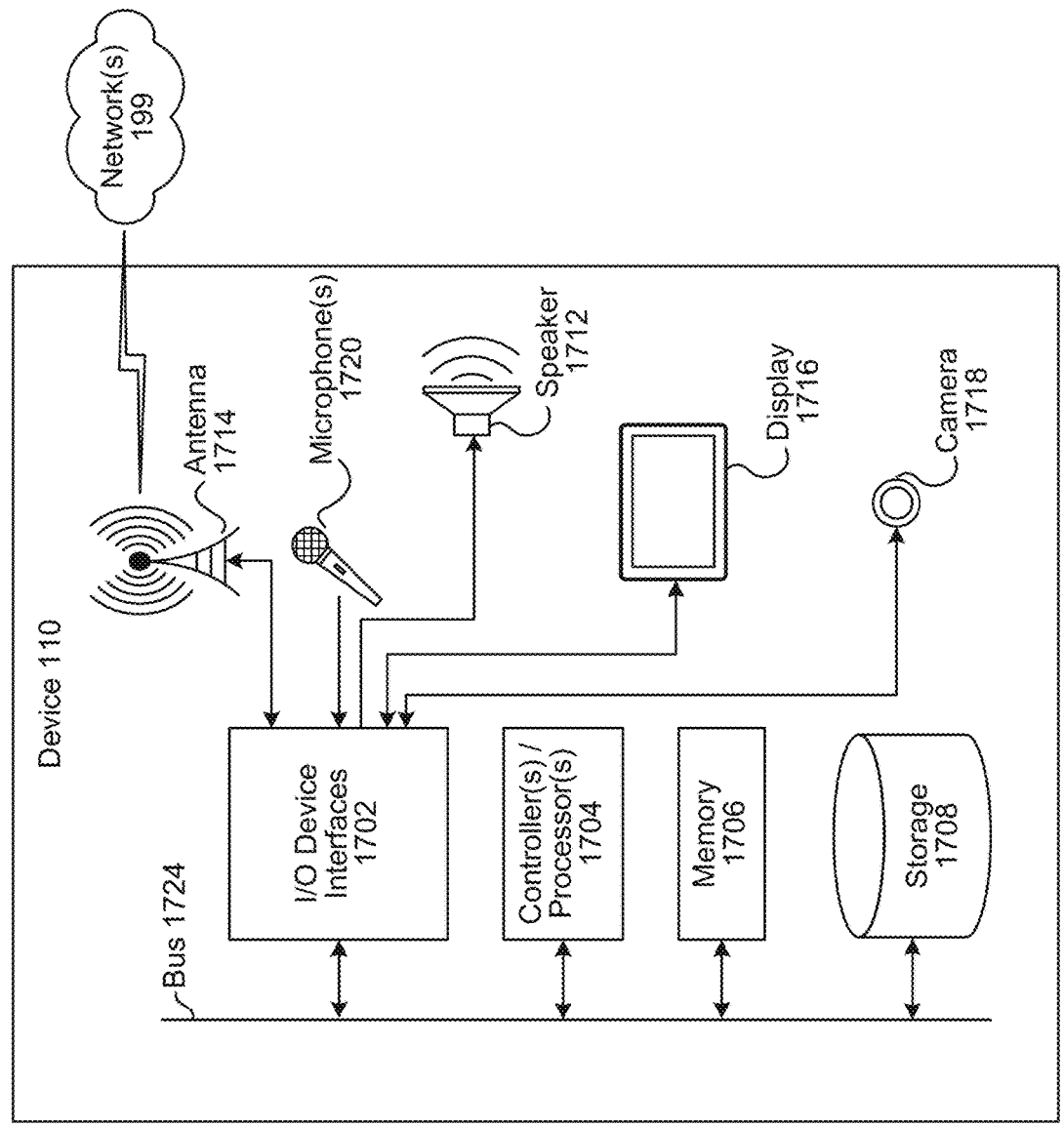
FIG. 17 is a block diagram conceptually illustrating example components of a device according to embodiments of the present disclosure.
Figure 19:
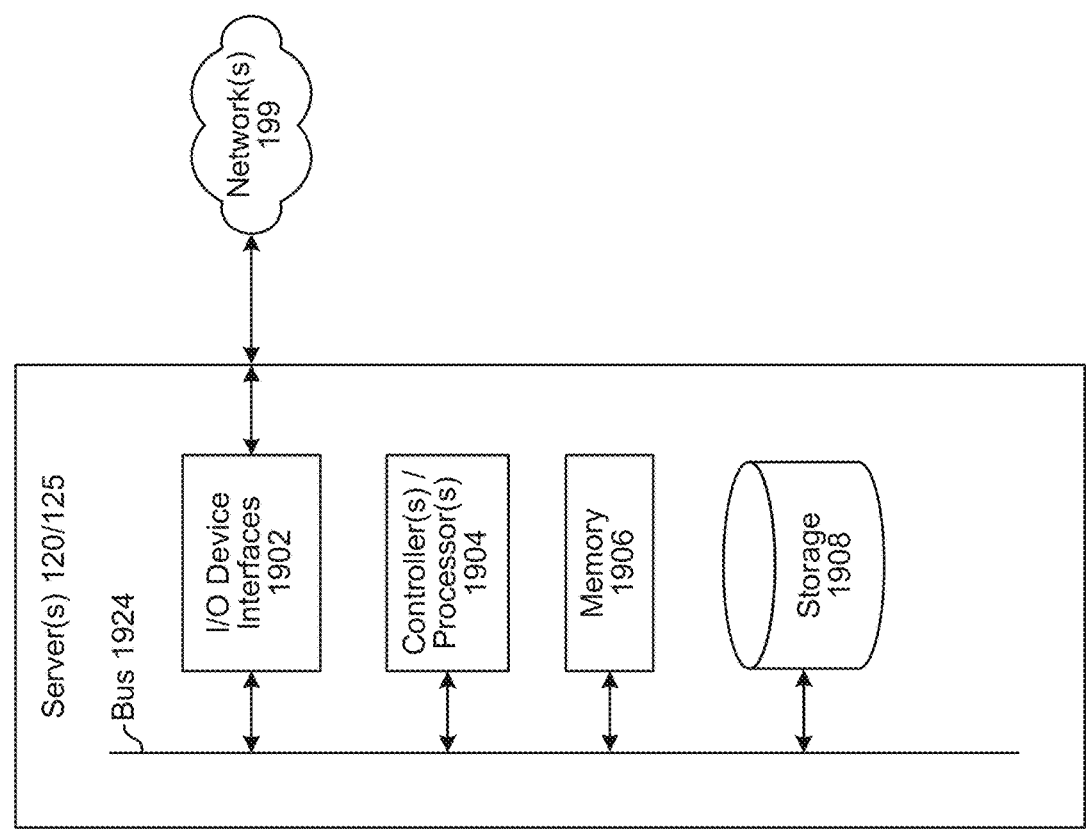
FIG. 19 is a block diagram conceptually illustrating example components of a system according to embodiments of the present disclosure.

FIG. 17 is a block diagram conceptually illustrating a device 110 that may be used with the system. FIG. 18 is a block diagram conceptually illustrating a device 112 that may be used with the system. FIG. 19 is a block diagram conceptually illustrating example components of the remote system 120/skill system 125, which may be one or more servers and which may assist with ASR processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/ components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the remote system 120 and/or the skill system 125, such as one or more servers for performing ASR processing, one or more servers for performing NLU processing, etc. In operation, each of these server (or groups of devices) may include computer-readable and computer-executable instructions that reside on the respective server, as will be discussed further below.

Each of these devices/systems (110/112/120/125) may include one or more controllers/processors (1704/1804/1904), which may each include a central processing unit (CPU) for processing data and computer-readable instructions, and a memory (1706/1806/1906) for storing data and instructions of the respective device. The memories (1706/1806/1906) may individually include volatile random access memory (RAM), non-volatile read only memory (ROM), non-volatile magnetoresistive memory (MRAM), and/or other types of memory. Each device (110/112/120/125) may also include a data storage component (1708/1808/1908) for storing data and controller/processor-executable instructions. Each data storage component (1708/1808/1908) may individually include one or more non-volatile storage types such as magnetic storage, optical storage, solid-state storage, etc. Each device (110/112/120/125) may also be connected to removable or external non-volatile memory and/or storage (such as a removable memory card, memory key drive, networked storage, etc.) through respective input/output device interfaces (1702/1802/1902).

Computer instructions for operating each device/system (110/112/120/125) and its various components may be executed by the respective device's controller(s)/processor(s) (1704/1804/1904), using the memory (1706/1806/1906) as temporary "working" storage at runtime. A device's computer instructions may be stored in a non-transitory manner in non-volatile memory (1706/1806/1906), storage (1708/1808/1908), or an external device(s). Alternatively, some or all of the executable instructions may be embedded in hardware or firmware on the respective device in addition to or instead of software.

Each device/system (110/112/120/125) includes input/output device interfaces (1702/1802/1902). A variety of components may be connected through the input/output device interfaces (1702/1802/1902), as will be discussed further below. Additionally, each device (110/112/120/125) may include an address/data bus (1724/1824/1924) for conveying data among components of the respective device. Each component within a device (110/112/120/125) may also be directly connected to other components in addition to (or instead of) being connected to other components across the bus (1724/1824/1924).

Referring to FIG. 17, the device 110 may include input/output device interfaces 1702 that connect to a variety of components such as an audio output component such as a speaker 1712, a wired headset or a wireless headset (not illustrated), or other component capable of outputting audio. The device 110 may also include an audio capture component. The audio capture component may be, for example, a microphone 1720 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display 1716 for displaying content. The device 110 may further include a camera 1718. While FIG. 17 illustrates the device 110 connecting to the speaker 1712, the antenna 1714, the display 1716, the camera 1718, and the microphone(s) 1720, the disclosure is not limited thereto and the device 110 may connect to any combination of these components without departing from the disclosure.

Referring to FIG. 18, the device 112 (e.g., input device) may include input/output device interfaces 1802 that connect to a variety of components such as sensors 114. As described above, the device 112 may receive input data from any sensor 114 known to one of skill in the art, including measurement data (e.g., height, weight, temperature, heart rate, blood pressure, oxygen levels, etc.), which may be referred to as diagnostic data, and/or the like.

Via antenna(s) 1714/1814, the input/output device interfaces 1702/1802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. The input/output device interfaces 1902 for the remote system 120/skill system 125 may also connect to one or more networks 199 via a wired connection. Through the network(s) 199, the system may be distributed across a networked environment. The I/O device interface (1702/1802/1902) may also include communication components that allow data to be exchanged between devices such as different physical systems in a collection of systems or other components.

The components of the device(s) 110/112, the remote system 120, and the skill system 125 may include their own dedicated processors, memory, and/or storage. Alternatively, one or more of the components of the device(s) 110/112, the remote system 120, or the skill system 125 may utilize the I/O interfaces (1702/1802/1902), processor(s) (1704/1804/1904), memory (1706/1806/1906), and/or storage (1708/1808/1908) of the device(s) 110/112, the remote system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/112, the remote system 120, and the skill system 125, as described herein, are illustrative, and may be located as a stand-alone device or may be included, in whole or in part, as a component of a larger device or system.

Figure 20:
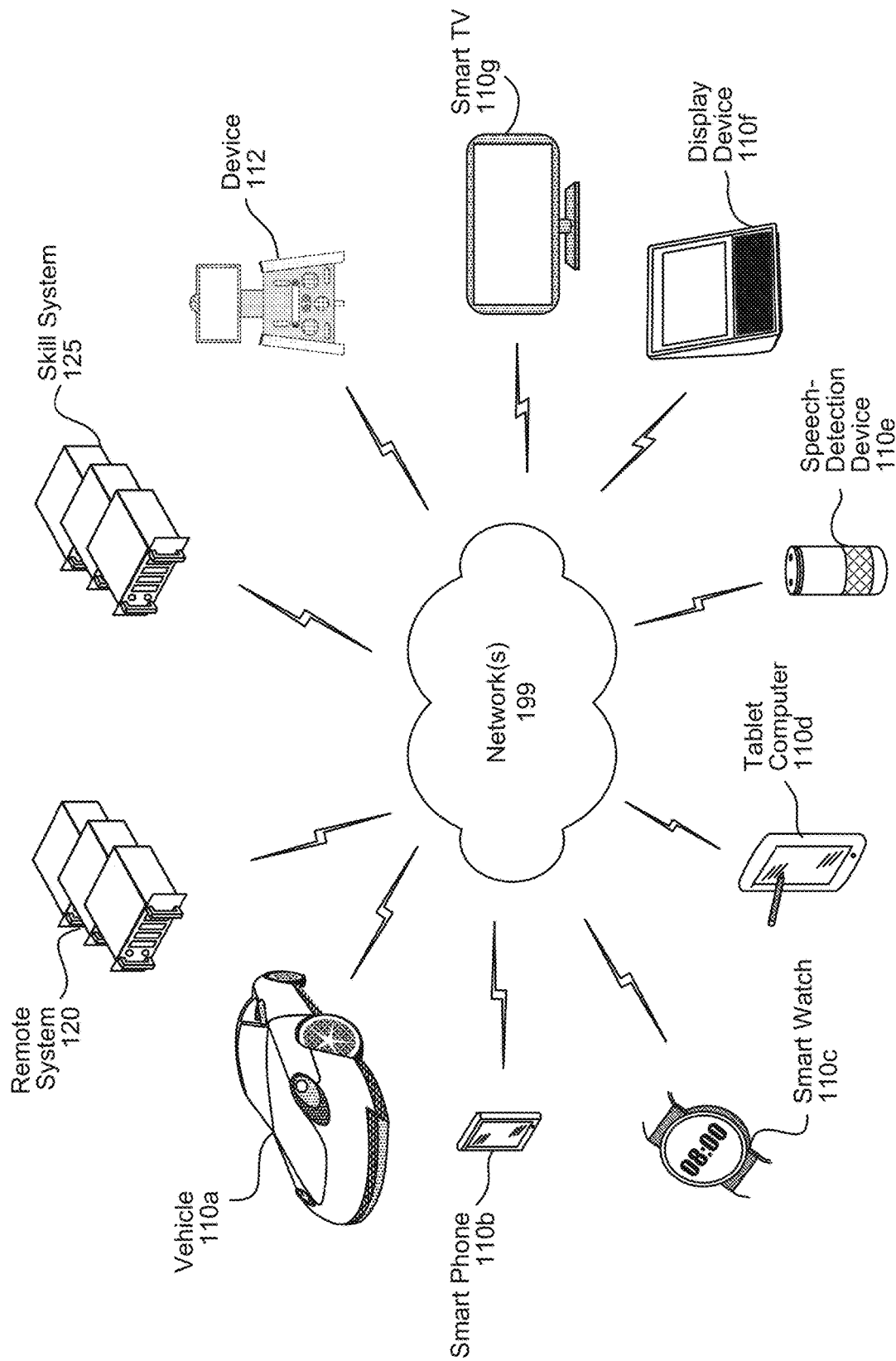
FIG. 20 illustrates an example of a network of devices according to embodiments of the present disclosure.

As illustrated in FIG. 20, multiple devices (110a-110g, 112, 120, 125) may contain components of the system, and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a speech-detection device 110e, a display device 110f, a smart television 110g, and/or a motile device 112 may be connected to the network(s) 199 through a wired connection, a wireless service provider, over a WiFi or cellular network connection, and/or the like.

While FIG. 20 illustrates an example of the vehicle 110a, the disclosure is not limited thereto. In some examples, the vehicle 110a may generate observations in an outdoor environment (e.g., detect the user when the user is in the garage, driveway, or other areas outside of a residence or building). However, the disclosure is not limited thereto and in other examples, the vehicle 110a may indicate that the user is not within the environment (e.g., not at home). For example, when the vehicle 110a detects that the user is present within the vehicle 110a while the vehicle 110a is outside of the environment, the system 100 may use this observation data to indicate that the user is not home and therefore unlikely to be present within the environment.

Other devices are included as network-connected support devices, such as the remote system 120, the skill system 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method to determine a user location, the method comprising:

generating, by a first device associated with a first user profile associated with a user, first data indicating that the user is detected in a first location during a first time period, the first data including first coordinate data of the first location and first timestamp data corresponding to the first time period;

generating, by the first device, second data indicating that the user is detected in a second location during a second time period, the second data including second coordinate data of the second location and second timestamp data corresponding to the second time period;

generating, by the first device, combined data including the first data and the second data, the combined data indicating a plurality of locations at which the user was detected;

processing the combined data using a clustering algorithm to generate first cluster data that is associated with the first user profile, the first cluster data representing a first cluster indicating a first area that includes the first location and a second cluster indicating a second area that includes the second location;

receiving, during a third time period, audio data representing an utterance from the user;

determining, using the first cluster data, a first probability value indicating a first likelihood that the user is present within the first area during the third time period;

determining, using the first cluster data, a second probability value indicating a second likelihood that the user is present within the second area during the third time period;

determining that the first probability value exceeds the second probability value; and generating location data indicating that the user is likely to be present within the first area during the third time period.

2. The computer-implemented method of claim 1, wherein determining the first probability value further comprises:

determining a first number of observations associated with the first cluster, the first number of observations corresponding to a portion of the plurality of locations at which the user was detected within the first area;

determining a second number of observations associated with the first cluster data, the second number of observations corresponding to the plurality of locations; and determining the first probability value by dividing the first number of observations by the second number of observations, wherein generating the location data further comprises:
  determining third coordinate data associated with the first area, the third coordinate data representing a mean of a plurality of coordinates of the portion of the plurality of locations;
  determining a covariance matrix representing a distribution of the portion of the plurality of locations; and
  generating the location data including the third coordinate data and the covariance matrix.

3. The computer-implemented method of claim 1, further comprising:
  generating third data indicating that the user is detected in a third location during a fourth time period;
  determining that the third location is included within the first area;
  determining that the first cluster data represents the first cluster using a first mean and a first covariance matrix indicating a first distribution of a portion of the plurality of locations at which the user was detected within the first area;
  determining, using the third location and the first mean, a second mean for the first cluster;
  determining, using the third location and the first covariance matrix, a second covariance matrix for the first cluster; and
  generating, using the second mean and the second covariance matrix, second cluster data that represents the first cluster.

4. A computer-implemented method, the method comprising:
  receiving first data indicating that a first user is detected in at least a first location in an environment during a first time period, the first user associated with a first user profile;
  generating, using the first data, first cluster data that is associated with the first user profile, the first cluster data representing at least a first cluster associated with a first area in the environment that includes the first location;
  receiving, from a first device during a second time period, a request associated with the first user profile;
  determining, using the first cluster data, a first probability value indicating a first likelihood that the first user is present within the first area during the second time period;
  determining that the first probability value satisfies a condition;
  generating location data indicating at least the first area within the environment; and
  sending the location data to the first device.

5. The computer-implemented method of claim 4, further comprising:
  determining, using the first cluster data, a second probability value indicating a second likelihood that the first user is present within a second area within the environment during the second time period; and
  determining that the second probability value satisfies the condition,
  wherein generating the location data further comprises generating the location data indicating at least the first area, the first probability value, the second area, and the second probability value.

6. The computer-implemented method of claim 4, wherein determining the first probability value further comprises:
  determining a first number of observations associated with the first cluster;
  determining a second number of observations associated with the first cluster data; and
  determining, using the first number of observations and the second number of observations, the first probability value,
  wherein generating the location data further comprises:
    determining first coordinate data associated with the first area, the first coordinate data corresponding to a mean of a plurality of coordinates associated with the first number of observations; and
    determining a covariance matrix associated with the first cluster.

7. The computer-implemented method of claim 4, further comprising:
  receiving second data including a first observation indicating that the first user is detected in a second location in the environment during a third time period;
  identifying a second cluster represented in the first cluster data that is associated with the second location;
  determining, using the second location and a first mean associated with the second cluster, a second mean corresponding to the second cluster;
  determining, using the second location and a first covariance matrix associated with the second cluster, a second covariance matrix corresponding to the second cluster; and
  generating second cluster data, the second cluster data including the second mean and the second covariance matrix.

8. The computer-implemented method of claim 4, further comprising:
  receiving second data including a first observation indicating that the first user is detected in a second location in the environment during a third time period;
  determining that the second location is not associated with the first cluster data;
  generating, using the second location, first coordinate data associated with a second cluster;
  generating, using the second location, a first covariance matrix corresponding to the second cluster; and
  generating, using the first cluster data, second cluster data representing at least the first cluster and the second cluster.

9. The computer-implemented method of claim 4, wherein determining the first probability value further comprises:
  determining a first number of observations associated with the first cluster that were generated by the first device, the first number of observations corresponding to the first user being detected within the first area;
  determining a second number of observations generated by the first device within the first area;
  determining a third number of total observations generated by the first device; and
  determining the first probability value using the first number of observations, the second number of observations, and the third number of total observations.

10. The computer-implemented method of claim 4, further comprising, prior to receiving the first data:
  receiving second data associated with the first user profile, the second data corresponding to a plurality of observations including a first observation indicating that the first user was detected in a second location during a third time period;
  determining a first number of observations associated with the plurality of observations;

determining that the first number is below a threshold value;

determining first probability data corresponding to a plurality of user profiles; and generating, using the first probability data, second probability data associated with the environment.

11. The computer-implemented method of claim 10, wherein generating the second probability data further comprises:

determining a first semantic tag associated with the first area;

identifying a second probability value in the first probability data associated with the first semantic tag; and generating a portion of the second probability data by associating the second probability value with the first area.

12. The computer-implemented method of claim 4, further comprising:

determining, by the first device using one or more sensors, that human presence is not detected in a second location during a third time period;

detecting, by the first device using the one or more sensors, human presence in the second location during a fourth time period;

determining that the first user is detected in the second location during the fourth time period; and generating a first observation indicating that the first user is detected in the second location during the fourth time period.

13. The computer-implemented method of claim 4, further comprising:

receiving, from the first device during a third time period, a second request associated with second user profile, the second user profile corresponding to a second user;

determining, using second cluster data associated with the second user profile, a second probability value indicating a second likelihood that the second user is present within a second area in the environment during the third time period;

determining that the second probability value satisfies the condition;

generating second location data indicating at least the second area within the environment; and sending the second location data to the first device.

14. A system comprising:

at least one processor; and memory including instructions operable to be executed by the at least one processor to cause the system to:

receive first data indicating that a first user is detected in at least a first location in an environment during a first time period, the first user associated with a first user profile;

generate, using the first data, first cluster data that is associated with the first user profile, the first cluster data representing at least a first cluster associated with a first area in the environment that includes the first location;

receive, from a first device during a second time period, a request associated with the first user profile;

determine, using the first cluster data, a first probability value indicating a first likelihood that the first user is present within the first area during the second time period;

generate location data indicating at least the first area within the environment; and send the location data to the first device.

15. The system of claim 14, wherein the memory further comprises instructions that, when executed by the at least one processor, further cause the system to:

determine, using the first cluster data, a second probability value indicating a second likelihood that the first user is present within a second area within the environment during the second time period;

determine that the second probability value satisfies a condition; and generate the location data indicating at least the first area, the first probability value, the second area, and the second probability value.

16. The system of claim 14, wherein the memory further comprises instructions that, when executed by the at least one processor, further cause the system to:

determine a first number of observations associated with the first cluster;

determine a second number of observations associated with the first cluster data;

determine, using the first number of observations and the second number of observations, the first probability value;

determine first coordinate data associated with the first area, the first coordinate data corresponding to a mean of a plurality of coordinates associated with the first number of observations; and determine a covariance matrix associated with the first cluster.

17. The system of claim 14, wherein the memory further comprises instructions that, when executed by the at least one processor, further cause the system to, prior to receiving the request:

receive second data including a first observation indicating that the first user is detected in a second location in the environment during a third time period;

identify a second cluster represented in the first cluster data that is associated with the second location;

determine, using the second location and a first mean associated with the second cluster, a second mean corresponding to the second cluster;

determine, using the second location and a first covariance matrix associated with the second cluster, a second covariance matrix corresponding to the second cluster; and generate second cluster data, the second cluster data including the second mean and the second covariance matrix.

18. The system of claim 14, wherein the memory further comprises instructions that, when executed by the at least one processor, further cause the system to, prior to receiving the request:

receive second data including a first observation indicating that the first user is detected in a second location in the environment during a third time period;

determine that the second location is not associated with the first cluster data;

generate, using the second location, first coordinate data associated with a second cluster;

generate, using the second location, a first covariance matrix corresponding to the second cluster; and generate, using the first cluster data, second cluster data representing at least the first cluster and the second cluster.

19. The system of claim 14, wherein the memory further comprises instructions that, when executed by the at least one processor, further cause the system to:

determine a first number of observations associated with the first cluster that were generated by the first device during a third time period, the first number of observations corresponding to the first user being detected within the first area;

determine a second number of observations generated by the first device within the first area during the third time period;

determine a third number of total observations generated by the first device during the third time period; and determine the first probability value using the first number of observations, the second number of observations, and the third number of total observations.

20. The system of claim 14, wherein the memory further comprises instructions that, when executed by the at least one processor, further cause the system to, prior to receiving the request:

receive second data associated with the first user profile, the second data corresponding to a plurality of observations including a first observation indicating that the first user was detected in a second location during a third time period;

determine a first number of observations associated with the plurality of observations;

determine that the first number is below a threshold value;

determine first probability data corresponding to a plurality of user profiles; and generate, using the first probability data, second probability data associated with the environment.

* * * * *